United States Patent [19]
Wechter et al.

[11] 3,894,000
[45] July 8, 1975

[54] ARA-CYTIDINE DERIVATIVES AND PROCESS OF PREPARATION

[75] Inventors: William J. Wechter; Donald T. Warner, both of Kalamazoo, Mich.

[73] Assignee: The Upjohn Company, Kalamazoo, Mich.

[22] Filed: July 19, 1973

[21] Appl. No.: 380,850

Related U.S. Application Data

[63] Continuation of Ser. No. 110,312, Jan. 27, 1971, abandoned.

[52] U.S. Cl............................ 260/211.5 R; 424/180
[51] Int. Cl............................................ C07d 51/52
[58] Field of Search .............................. 260/211.5 R

[56] References Cited
UNITED STATES PATENTS

| | | | |
|---|---|---|---|
| 3,309,359 | 3/1967 | Duschinsky et al.......... | 260/211.5 R |
| 3,338,882 | 8/1967 | Wechter...................... | 260/211.5 R |
| 3,457,253 | 7/1969 | Wechter...................... | 260/211.5 R |
| 3,462,416 | 8/1969 | Hanze et al.................. | 260/211.5 R |
| 3,463,850 | 8/1969 | Shen et al.................... | 260/211.5 R |
| 3,658,788 | 4/1972 | Orgel et al................... | 260/211.5 R |
| 3,709,874 | 1/1973 | Moffatt et al................ | 260/211.5 R |

*Primary Examiner*—Johnnie R. Brown
*Attorney, Agent, or Firm*—Martin B. Barancik; Roman Saliwanchik

[57] ABSTRACT

Novel 2'-O-, 3'-O-, 2',3'-di-O-, 2',5'-di-O- and 3',5'-di-O-esters of ara-cytidine and novel processes for their preparation are claimed. The novel 2'-O-esters (1) and 2',5'-di-O-esters (11) are embraced by the formula

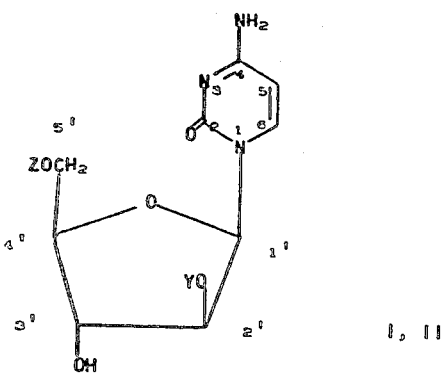

wherein Y is selected from the group consisting of

1.

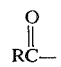

RC— wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms, including such radicals substituted by halogen, hydroxyl, carboxyl, nitro, alkoxyl or mercapto groups;

2.

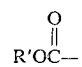

R'OC— wherein R' is a radical selected from the group consisting of aliphatic of from 1 through 20 carbon atoms, aromatic of from 6 through 10 carbon atoms, araliphatic of from 7 through 12 carbon atoms, and Z is selected from the group consisting of Y and hydrogen; and pharmaceutically acceptable acid addition salts thereof.

The novel 3'-O-esters (III) and 3',5'-di-O-esters (IV) are embraced by the formula

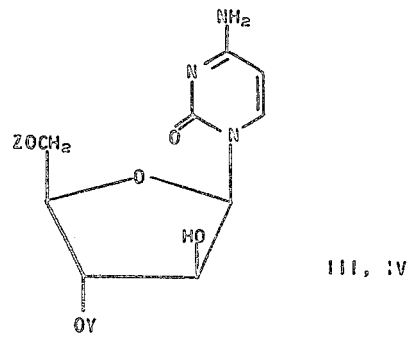

wherein Z and Y are as given above, and pharmaceutically acceptable acid addition salts thereof.

The novel 2',3'-di-O-esters (V) are embraced by the formula

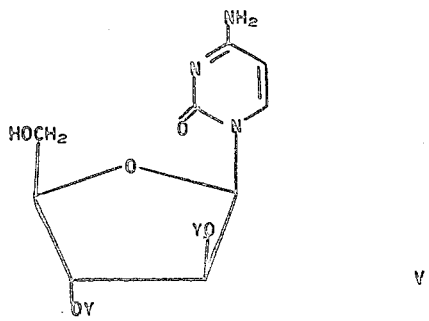

wherein Y is as given above, and pharmaceutically acceptable acid addition salts thereof.

The compounds of the above formulae are orally active sustained-release immunosuppressant and anti-neoplastic agents having the characteristics of the anti-leukemic compound ara-cytidine.

45 Claims, No Drawings

ARA-CYTIDINE DERIVATIVES AND PROCESS OF PREPARATION

CROSS REFERENCE TO RELATED APPLICATIONS

This is a continuation, of application Ser. No. 110,312, filed Jan. 27, 1971, now abandoned.

BRIEF SUMMARY OF THE INVENTION

The 2'-o-esters and 2',5'-di-o-esters of ara-cytidine of this invention are included within the generic formula

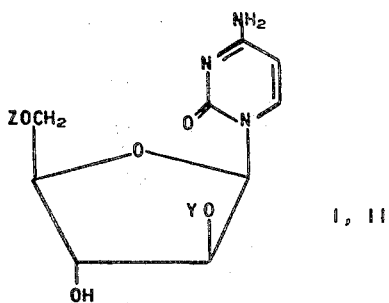

I, II wherein Y is selected from the group consisting of
1.

RC— wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms, including such radicals substituted by halogen, hydroxyl, carbonyl, nitro, alkoxyl or mercapto groups, and
2.

R'OC— wherein R' is a radical selected from the group consisting of aliphatic of from 1 through 20 carbon atoms, aromatic of from 6 through 10 carbon atoms, and araliphatic of from 7 through 12 carbon atoms,
and Z is selected from the group consisting of Y and hydrogen; and pharmaceutically acceptable acid addition salts thereof.

The novel 3'-o-esters (III) and 3',5'-di-0-esters (IV) are included in the formula

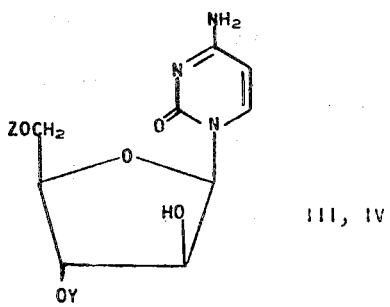

III, IV wherein Z and Y are as given above, and pharmaceutically acceptable acid addition salts thereof.

The novel 2',3'-di-o-esters esters (V) are included in the formula

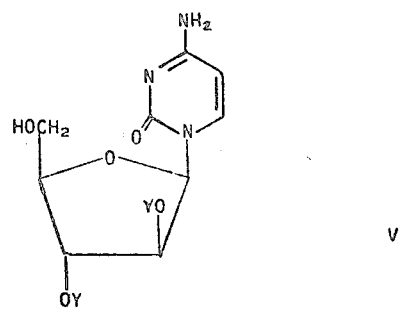

V wherein Y is as given above, and pharmaceutically acceptable acid addition salts thereof.

The aliphatic and araliphatic radicals in the above formulae I through V can be straight or branched chain, saturated or unsaturated.

Representative acyl

(RC—)

groups in the foregoing are: acetyl, pivaloyl, isobutyryl, octanoyl (caproyl), palmityl, stearyl, oleyl, β-chloropivaloyl, p-nitrobenzoyl, o-toluoyl, benzoyl, 2,6-dimethylbenzoyl, 2,4,6-trimethylbenzoyl, 1-fluorenecarbonyl, 9-fluoroenecarbonyl, 1-naphthoyl. 1-indenecarbonyl, p-anisoyl, 3,4,5-trimethoxybenzoyl, p-toluoyl, 1-norbornanecarbonyl, exo- or exo/endo-mixture of 2-norboranecarbonyl, 7-norbornanecarbonyl, 2-adamantanecarbonyl, 1-adamantaneacetyl, α-chloro-3,5,7-trimethyl-1-adamantaneacetyl, pentacyclo[$4.2.0.0^{2,5}.0^{3,8}.0^{4,7}$]-octanecarbonyl (cubanecarbonyl),cyclobutanecarbonyl, cyclopentanecarbonyl, cyclohexanecarbonyl, picolinyl, tetrahydrofuroyl (tetrahydropyromuconyl), 10-xanthanecarbonyl, nicotinyl, 6-methoxy-4-quinoline carbonyl (quininyl), 4-cinnolinecarbonyl, 2-thiophenecarbonyl, 4-thionaphtheneacetyl, 2-furoyl, 5-bromo-2-furoyl, coumaryl, coumarin-3 -carbonyl, isonicotinoyl, 2-quinuclidinecarbonyl, 3-quinuclidinecarbonyl, 4-quinuclidinecarbonyl, N-trichloroethoxycarbonyl-2-pyrrolecarbonyl, N-trichloroethoxycarbonyl-2-pyrrolecarbonyl, N-trichloroethoxycarbonyl-2-indolecarbonyl, N-trichloroethoxycarbonyl-3-indolecarbonyl, hydroxybenzoyl, 3-propylhygroyl, hemisuccinyl, hemifumaryl, hemiglutamyl, hemiglutaryl, hemi-(3,3-dimethyl)glutaryl, hemiitaconyl, hemiaconityl, and levulinyl, as well as those wherein the radical R is

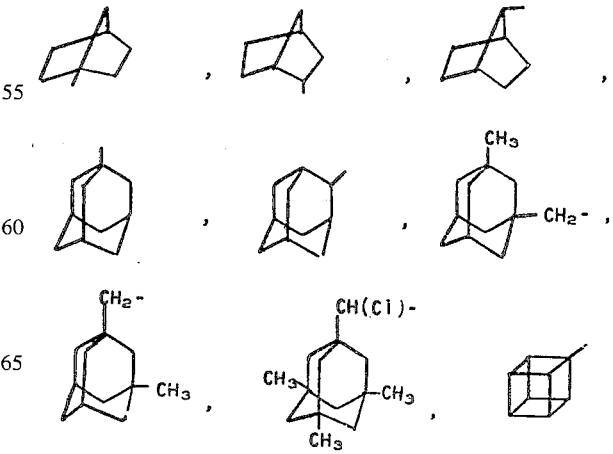

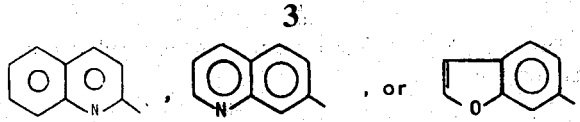

The novel ester compounds of this invention are prepared by novel acylation, i.e., novel esterification, of novel suitably protected ara-cytidine intermediates.

One important class of such novel invention compounds is that obtained where the acylating agent used is an acyl halide or an anhydride of an aliphatic acid containing 1 through 18 carbon atoms, such as acetyl chloride or anhydride, isobutyryl bromide or anhydride, isobutyryl bromide or anhydride, caproyl chloride or anhydride, palmityl chloride or anhydride, stearyl chloride or anhydride, lauryl chloride or anhydride, oleyl chloride or anhydride, myristic chloride or anhydride, isomers and the like.

Another important class of novel compounds of this invention is that wherein the acyl radical

is that of a dicarboxylic aliphatic acid of from 3 through 8 carbon atoms, such as glutaric, 3,3-dialkylglutaric, succinic, itaconic, or fumaric acid, and the like, wherein the acylating agent used is the corresponding acid anhydride.

Where the acyl radical attached to the 3-oxygen of aracytidine is

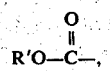

the acylating agent is

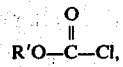

and the acylation is carried out on novel protected aracytidine intermediates following known procedures for the preparation of carbonate esters. In this class R' is a radical selected from the group consisting of aliphatic of from 1 through 20 carbon atoms, aromatic of from 6 through 10 carbon atoms, and araliphatic of from 7 through 12 carbon atoms. Representative acylating agents are methyl chloroformate, ethyl chloroformate, butyl chloroformate, carbobenzoxy chloride, octanoyl chloromate, palmityl chloroformate, phenyl chloroformate, etc.

These processes for preparing the novel esters are described below.

Process A.

2'-o-, 3'-o-, and 2',3'-di-o- Esterification Process wherein Y is

The compounds of the formulae

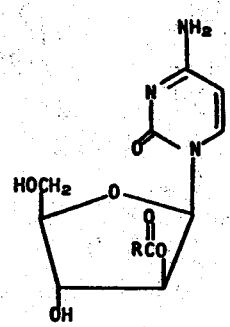

I

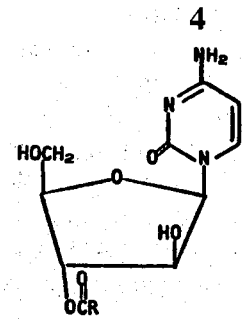

III

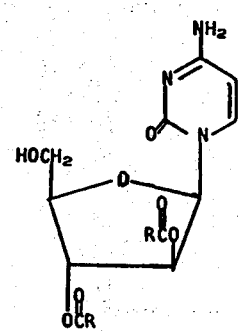

V wherein R has the same meaning as above, are prepared by the steps comprising 1. mixing a compound of the formula

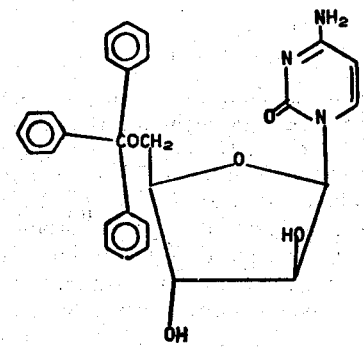

VI with a trihaloethoxycarbonyl halide of the formula

wherein X is selected from the group consisting of chlorine and bromine, to yield a corresponding compound of the formula

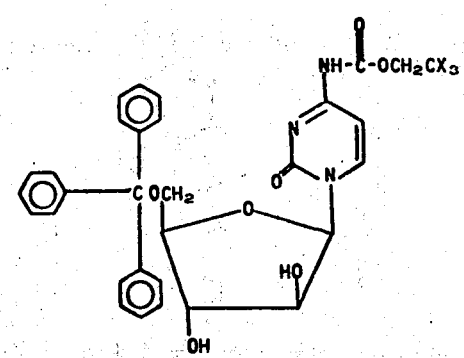

VII wherein X has the same meaning as above;

2. acylating the thus-produced compound to yield corresponding compounds of the formulae

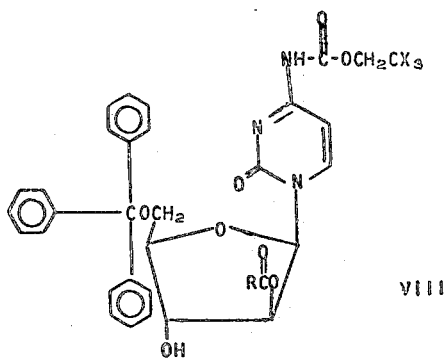

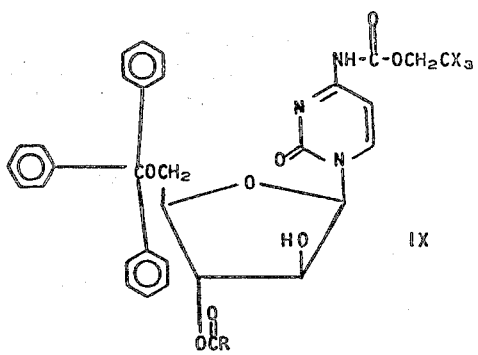

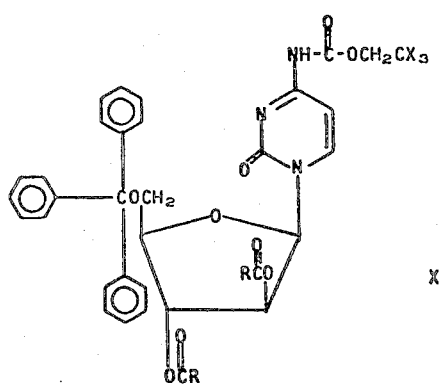

wherein X and R have the same meaning as above;

3. separating the acylation products from each other; and 4. hydrolyzing at the 5'-o- and N⁴-positions to yield corresponding compounds of Formulae I, III and V.

Alternatively, steps (3) and (4) may be interchanged.

The starting material employed in step (1), 5'-o-trityl-ara-cytidine (VI), is prepared as in Example 6 of U.S. Pat. No. 3,284,440.

In further detail,

1. The first step of Process A involves reacting approximately equimolar amounts of the 5'-protected starting compound 5'-o-trityl-ara-cytidine (VI) in a solvent (e.g., dry pyridine) at low or moderate temperature with a trihaloethoxycarbonyl halide, e.g., trichloroethoxycarbonyl chloride or tribromoethoxycarbonyl chloride, to yield a corresponding N⁴-trihaloethoxycarbonyl-5'-o-trityl-ara-cytidine (VII), which has both 5'-o- and N⁴-positions protected against subsequent acylation in step (2).

2. The next step of the process comprises acylating N⁴-trihaloethoxycarbonyl-5'-o-trityl-ara-cytidine (VII) to yield corresponding acyl-N⁴-trihaloethoxycarbonyl-5'-o-trityl-ara-cytidines (VIII, IX, and X). The reaction can be carried out readily by mixing the compound of Formula VII with the appropriate acylating agent in a solvent such as dry pyridine at low or moderate (room) temperature. Numerous acylating agents, namely, acid chlorides of carboxylic acids or anhydrides of carboxylic acids, can be used; for example, acetic anhydride, propionic anhydride, acetyl chloride, pivaloyl chloride, palmityl chloride, benzoyl chloride, 9-fluorenecarbonyl chloride, p-anisoyl chloride, 1-norbornanecarbonyl chloride, cubanecarbonyl chloride, cyclopentanecarbonyl chloride, 10-xanthanecarbonyl chloride, 5-bromo-2-furoyl chloride, 3-quinuclidinecarbonyl chloride, succinic anhydride, and others previously described, appropriate for the acyl group $$\overset{O}{\underset{}{\|}}$$
$$RC-$$

desired.

The acid chlorides of the carboxylic acids used as acylating agents can be prepared by conventional methods, e.g., by reaction of the acid RCOOH (a) with $SOCl_2$ (b) with $PCl_5$ or (c) with $POCl_3$. The method (a) is suitable for most acids. For those that boil within 5° to 10° C. of $SOCl_2$, the method (c) is suitable.

In the foregoing acylation procedure acylation occurs at the 2'-o- position, and/or the 3'-o- position. In general, monoesterification is favored by using lower molar ratios of acylating agent to VII, from about 1.0 to about 1.5, preferably 1.1. Diesterification is favored by use of acylating agent in molar ratio of greater than 2, from about 2.1 to about 3, preferably about 2.3. The progress of the esterification reaction can be monitored by thin layer chromatography (TLC) using silica gel and ethyl acetate solvent systems or other TLC systems of the art.

3. The esterification products VIII, IX, and X are separated from each other and from other products and excess reactants by such art procedures as countercurrent distribution or chromatography. Of these, column chromatography on a suitable support is preferred. A typical column consists of silica gel as the support with elution by ethyl acetate-cyclohexane solvent mixtures, or similar mixtures, appropriate to the acylates being processed. For palmityl esters, 20:80 or 50:50 ethyl acetate:cyclohexane mixtures are appropriate. Admixture of ethyl alcohol, for example, a mixture of 5:3:1 cyclohexane:ethylacetate:ethanol is useful. Further solvent systems are illustrated in the Examples. The individual acylation can be detected in effluent fractions by monitoring tests, for example by UV absorbance. In general, the rates of travel are: 2',3'-di-o-esters fastest, 3'-o-esters slower, and 2'-o-esters slowest, often only slightly slower than the 3'-o-esters.

4. In the final step of the process, the simultaneous hydrolysis at the 5'- and N⁴-positions of the acylated N⁴-trihaloethoxycarbonyl-5'-o-trityl-ara-cytidines (VIII, IX, and X) yields the corresponding acyl-ara-cytidine (I, III or V). The hydrolysis is effected by mixing a compound of Formula VIII, IX or X with zinc (preferably as a dust) and acetic acid (e.g., 80 percent glacial acetic acid — 20 percent water), at moderate (room) to steam bath temperature for from several to about 24 hours, to yield the corresponding acyl-ara-cytidine (I, III or V).

Alternatively, the separation step (3) and the hydrolysis step (4) can be interchanged if desired.

Alternatively also, compounds of Formulae VIII, IX and X can be converted to the corresponding acyl-aracytidine (I, III or V) in two steps, e.g., by first mixing the former with a dilute solution of trifluoroacetic acid in a solvent such as chloroform to remove only the 5'-o-trityl group to yield the corresponding acyl-N⁴-trihaloethoxycarbonyl-ara-cytidine and then removing the protecting group at the N⁴-position from a thus-produced compound, e.g., by refluxing with zinc in methanol, to yield the corresponding acyl-ara-cytidine (I, III or V). Alternatively the N⁴-trihaloethoxycarbonyl group may be removed first by hydrolysis with zinc acetate and methanol or zinc chloride and methanol to yield the 3'-0-acyl-5'-o-trityl-ara-cytidine, and the 5'-o-trityl group is then removed with 80 percent glacial acetic acid - 20 percent water or by the use of about 1 percent trifluoroacetic acid in chloroform.

Process B

2'-o-, 3'-o-, and 2',3'-di-o-Esterification Process wherein Y is $$\underset{R'OC-}{\overset{O}{\underset{\|}{}}}$$

The compounds of the formulae

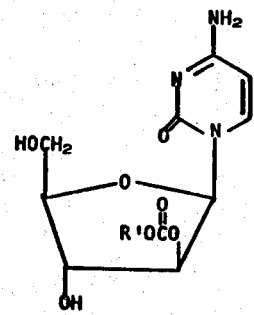

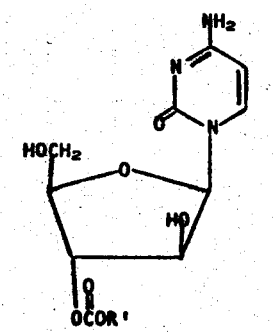

and

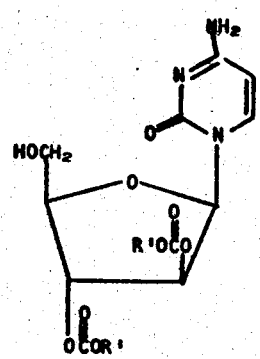

wherein R' has the same meaning as above, are prepared by the steps comprising 1. mixing a compound of the formula

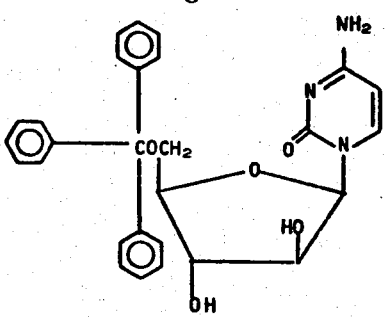

with a trihaloethoxycarbonyl halide of the formula $$\underset{CX_3CH_2OCX}{\overset{O}{\underset{\|}{}}}$$

wherein X is selected from the group consisting of chlorine and bromine, to yield a corresponding compound of the formula

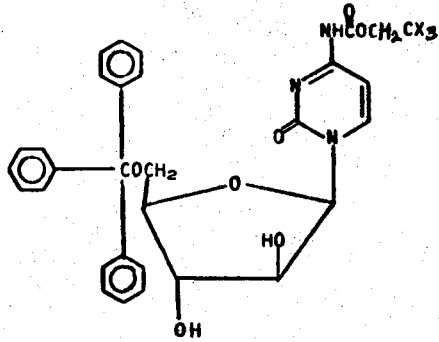

wherein X has the same meaning as above;

2. acylating the thus produced compound by mixing it with a compound of the formula $$\underset{R'OCCl}{\overset{O}{\underset{\|}{}}}$$

wherein R' has the same meaning as above, to yield corresponding compounds of the formulae

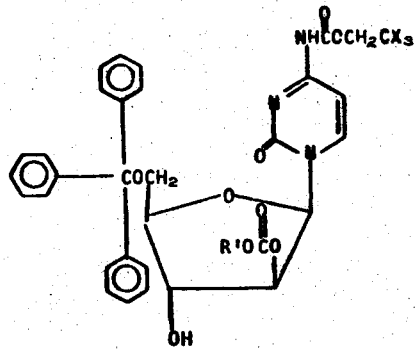

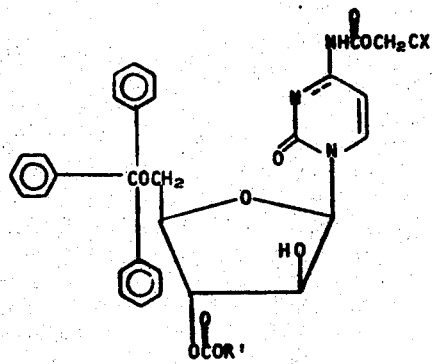

and

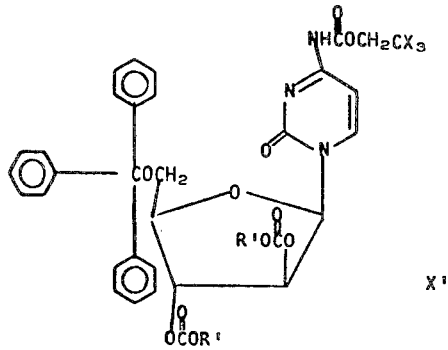

wherein R' and X have the same meaning as above;

3 separating the acylation products from each other, and 4 hydrolyzing at the 5'O- position and thereby removing the 5'-O-trityl group to yield corresponding compounds of the formulae

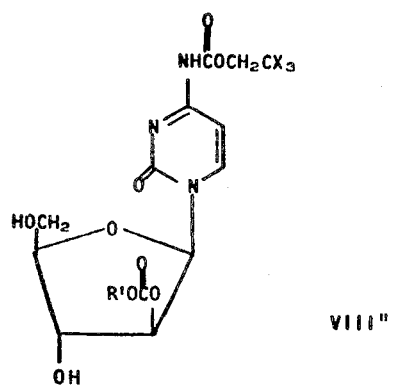

and

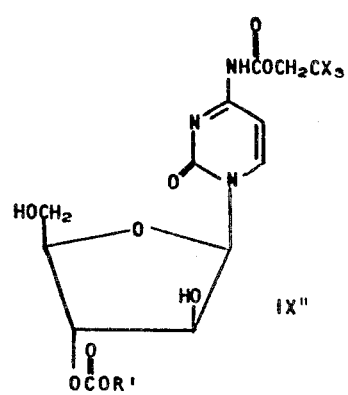

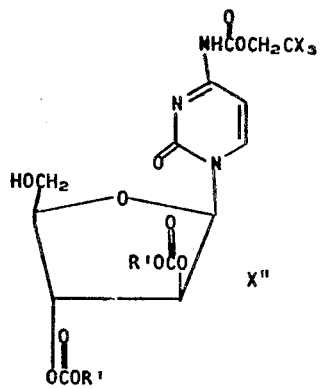

wherein R' and X have the same meaning as above, and 5 hydrolyzing at the N⁴-position of the thus produced compounds resulting in the production of compounds of Formulae I', III', and V', above.

If desired, step (3) may follow steps (4) and (5).

In further detail,

1 The first step of Process B is identical to the first step of Process A, above.

2. The second step of this process, acylation of an N⁴-trihaloethoxycarbonyl-5'-O-trityl-ara-cytidine (VII) to give the corresponding acyl-N⁴-trihaloethoxycarbonyl-5'-O-trityl-ara-cytidines (VIII', IX' and X'), is similar to step (2) of Process A, above. However, the acyl radical attached is

wherein R' has the same meaning as above, the acylating agent is

and the acylation is carried out following procedures known in the art for the preparation of carbonate esters; e.g., mixing a compound of Formula VII with an acylating agent

(such as methyl chloroformate, ethyl chloroformate, propyl chloroformate, carbobenzoxy chloride, octyl chloroformate, stearyyl chloroformate, phenyl chloroformate, xylyl chloroformate, etc.) at moderate (room) temperature, to yield corresponding acyl-N⁴-trihaloethoxycarbonyl-5'-O-trityl-ara-cytidines (VIII', IX' and X'). For monoesterification about 1.0 to about 1.5 moles, preferably about 1.1, of acylating agent are used, and for diesterification about 2.1 to about 3.0 are used, per mole of VII, preferably about 2.3 moles. In the foregoing acylation procedure acylation occurs at the 2'-O-position, and/or the 3'-O-position as described in step 2 of Process A, above.

3. The third step of this process comprises separating the acylation products one from another. This is conducted according to the principles of the equivalent separation step in Process A.

Alternatively, this step may be postponed until after the 5'-O- and N⁴-protective groups have been removed in steps (4) and (5)

'4. The fourth step of this process comprises hydrolyzing at the 5'-O-position to remove the 5'-O-trityl group and yield corresponding acyl-N⁴-trihaloethoxycarbonyl-ara-cytidines (VIII'', IX'' or X''). The hydrolysis is effected, for example, by mixing the acyl-N⁴-trihaloethoxycarbonyl-5'-O-trityl-ara-cytidine (VIII', IX' or X'') with a weak acid (e.g., acetic acid) at moderate (room) temperature, to yield the corresponding acyl-N⁴-trihaloethoxycarbonyl-ara-cytidine (VIII'', IX'' or X'').

5. The final step of the process is one of hydrolysis and consists of the removal of the N⁴-trihaloethoxycarbonyl protecting group to yield the corresponding acyl-ara-cytidine (I', III' and V'). The hydrolysis is effected, for example, by heating (e.g., at reflux) compounds of Formulae VIII'', IX'' or X'' in methanol with zinc, zinc acetate or zinc chloride and the like, to yield the corresponding acyl-ara-cytidine (I', III' and V').

Process C 2,5'- and 3'5'-Di-O-Esterification Process wherein Y and Z are $$\underset{\text{RC}-}{\overset{\text{O}}{\underset{\|}{}}}$$

The compounds of the formulae

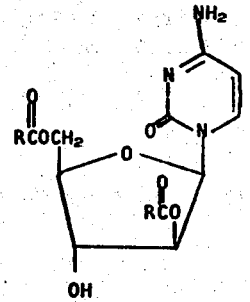

II and

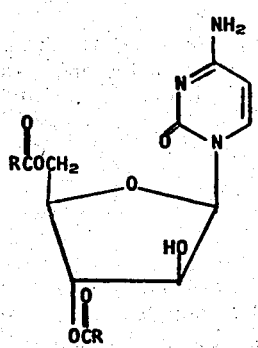

IV wherein R has the same meaning as above, are prepared by the steps comprising 1 acylating a compound of the formula

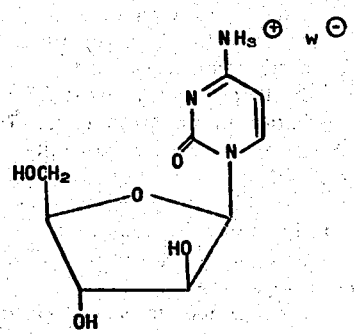

XIa wherein $w^-$ is an anion of a strong acid, to yield corresponding compounds of the formulae

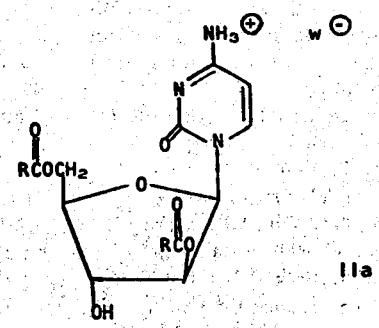

IIa and

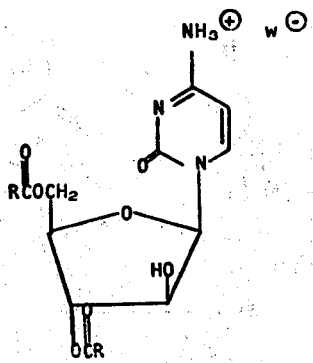

IVa wherein R and $w^-$ have the same meaning as above;

2. neutralizing to remove the proton at the $N^4$-position of a thus produced corresponding compound of Formula V, above, and 3. separating the acylation products.

In further detail,

1. The first step of Process C comprises acylating an acid salt (XIa) of the known compound ara-cytidine, such as the hydrochloride, hydrobromide, hydroiodide, sulfate, phophate, benzenesulfonate, etc. salt, to yield the corresponding diacyl-ara-cytidine salts (IIa and IVa). This reaction is readily carried out by mixing a compound of Formula XIa with the appropriate acylating agent in a solvent (e.g., dimethylacetamide, diethylformamide, propionamide, etc.) at moderate (room) temperature. Numerous acylating agents, i.e., anhydrides or chlorides of carboxylic acids can be employed; e.g., acetic anhydride, butytic anhydride, valeric anhydride, adipic anhydride, succinic anhydride, cyclopentane carbonyl chloride, isopicolinyl chloride, isonicotinyl chloride, xyloyl chloride, m-toluoyl chloride, o-anisoyl chloride, 1-naphthoyl chloride, 2,4,6-trimethylbenzoyl chloride, etc. To achieve diacylation of the ara-cytidine salt (XIa) a molar ratio of acylating agent to starting compound (XIa) in excess of that required for monoacylation should be used. The ratio should be in the range of about 2 to about 2.5 moles (preferably about 2.5 moles) of acylating agent per mole of $N^4$-protected compound (XIa). A greater excess of acylating agent should be avoided to minimize production of the 2',3',5'-tri-O-acylated Species which is produced concomitantly.

2 In the next step of the process, neutralization to remove the proton at the $N^4$-position acyl-ara-cytidine salts obtained in step (1) yields the corresponding diacyl-ara-cytidines (II and IV). The neutralization is effected by mixing compounds of Formulae IIa and IVa with a mild alkalinizing agent such as an alkali metal bicarbonate (e.g., potassium bicarbonate or sodium bicarbonate), or an organic base such as pyridine to yield corresponding compounds of Formulae II and IV. However because of the greater water solubilities of these acid salts, the compound of the Formulae IIa and IVa may be preferred as final products in certain instances where water solubility is desired.

3 In the last step of the process, the desired di-O-acylates are separated from each other and from coproduced monoacylates and triacylates, and from reactants and othr products, by art separation procedures as described previously, for example, by column chromatography.

Alternatively, the 3'-O (III) and 3',5'-di-O (IV) ara-cytidine esters of this invention can be prepared from 2,2'-anhydro-ara-cytidine (XIIa)

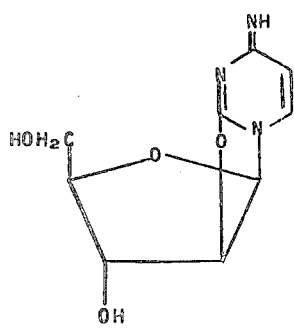

XIIa or its acid addition salts (XIIb)

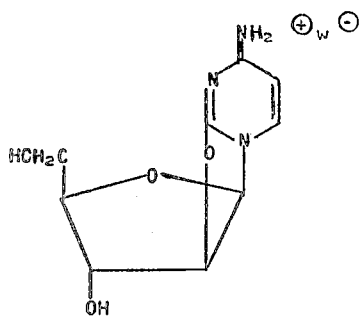

XIIb wherein $w^-$ is the anion of a strong acid, for example hydrochloric or sulfuric acid. 2,2'-Anhydro-ara-cytidine (XIIa) and its acid addition salts (XIIb) can be prepared according to J. Org. Chem. 32, 1462.

Use of 2,2'-anhydro-ara-cytidine in the synthesis of the esters of this invention is advantageous because in this anhydro compound the 2'-OH of ara-cytidine is already blocked and thus is not available for esterification. Exposure to water or alcohol, especially in the presence of base, tends to hydrolyze the anhydro linkage and should be avoided during synthesis or purification of the products, or in the isolation of intermediates, when such hydrolysis would be undesirable.

When 2,2'-anhydro-ara-cytidine of the unprotonated form XIIa is acylated, for example by acylating XIIa in pyridine, the $N^4$-imino group tends to be acylated in addition to the 3'- and 5'-OH groups, to produce the $N^4,3'$-O,5'-O-triacylate (XIII). This procedure (Process $D_1$ below) is nevertheless useful in the preparation of aromatic, for example benzoyl, 3',5'-di(O-acyl)ara-cytidine compounds, where the $N^4$-acyl group can readily be removed selectively by hydrazinolysis.

Alternatively, however, and usually preferably, 2,2'-anhydro-ara-cytidine may be used in its $N^4$-protonated form (XIIb) as an acid addition salt (Process $D_2$). Such protonation blocks undesirable acylation at $N^4$ and, in avoiding the need for hydrazinolysis or other selective $N^4$-diacylation, is advantageous over the use of XIIa.

Synthesis of the invention ara-cytidine acylate esters by use of an anhydro-ara-cytidine compound (XIIa or XIIb) proceeds first by acylation of an anhydro-ara-cytidine compound. If desired, such intermediate anhydro-ara-cytidine acylates may be isolated. Usually, however, the intermediates are not isolated and the synthesis process proceeds, for economy, to the hydrolysis step.

In the use of anhydro-ara-cytidine for the production of 3'-O-esters (III) of ara-cytidine a suitably 5'-O-protected form, for example 5'-O-trityl-anhydro-ara-cytidine, is used in the acylation reaction and the 5'-O-protective group is subsequently removed.

Process $D_1$

3',5'-Di-O-Esterification Process Using 2,2'-Anhydro-ara-cytidine (XIIa)

A compound of the formula

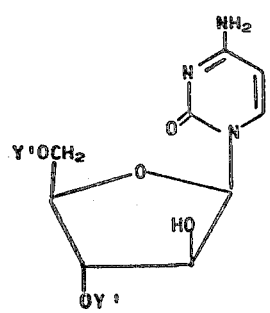

IV' wherein Y' is an aromatic acyl group of 6 through 12 carbon atoms is prepared by steps comprising
1. acylating a compound of the formula

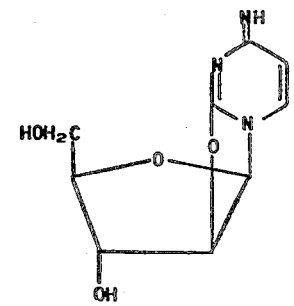

XIIa with an acylating agent
Y'OY' or Y'X₁
wherein Y' has the same meaning as above and $X_2$ is chloro, bromo or iodo, to give a corresponding compound of the formula

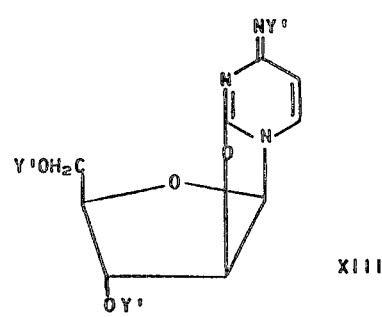

XIII 2. selectively removing the $N^4$-acyl group to give a corresponding compound of the formula

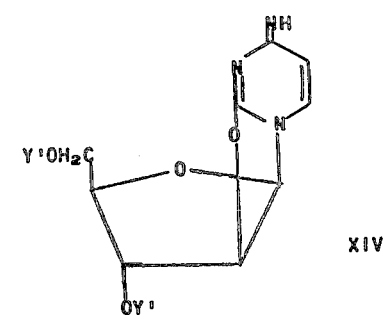

XIV wherein Y' has the same meaning as given above, and 3. hydrolyzing the 2,2'-anhydro linkage to yield the product compound of Formula IV'.

In further detail,

1. The acylation step is carried out by reaction of 2,2'-anhydro-ara-cytidine (XII) with an acylating agent, namely a corresponding aromatic acyl halide, for example an acyl chloride, bromide or iodide, or the corresponding aromatic acyl anhydride, in a suitable, usually basic, solvent which will not hydrolyze the 2,2'-anhydride linkage, for example pyridine (preferred), triethylamine, tributylamine or dimethylaminoaniline. As acylating agents the aromatic acyl chlorides are preferred, although other halides or the acyl anhydrides can be utilized. From about 3 to about 4, preferably about 3.5 moles of acylating agent should be used per mole of XIIa. Usually the reaction proceeds well at room temperature, but slightly elevated temperatures, for example about 55°, can be used to accelerate the reaction. Progress of the reaction can be estimated by suitable monitoring methods, for example by thin-layer chromatography. After reaction, the solvent is evaporated. If desired, the tri-acyl intermediate XIII can be isolated by recrystallization, column chromatography or other suitable art procedure.

2. The crude or purified intermediate product XIII is reacted with a suitable reagent to remove the $N^4$-acyl group; for example, hydrazine in pyridine-acetic acid, such as at a 4-1 ratio at room temperature. This procedure is particularly effective for aromatic acyls, for example benzoates. To protect the anhydro compounds, anhydrous conditions must be used. If desired, the intermediate compound XIV may be isolated. Usually, however, the next step is carried out without isolation.

3. The anhydro linkage is hydrolyzed by reaction with water, preferably with base catalysis. The resulting 3',5'-di(O-acyl)-ara-cytidine ester is purified by art procedures, for example by chromatograph, or recrystallization.

Alternatively, if desired, the 2,2'-anhydro linkage can be hydrolyzed before removal of the $N^4$-acyl group, for example by reaction with water or an alcohol and neutralization. In that case the intermediate $N^4$-,3'-O-,5'-O-triacylate (XV) can be isolated, for example by chromatography or recrystallization.

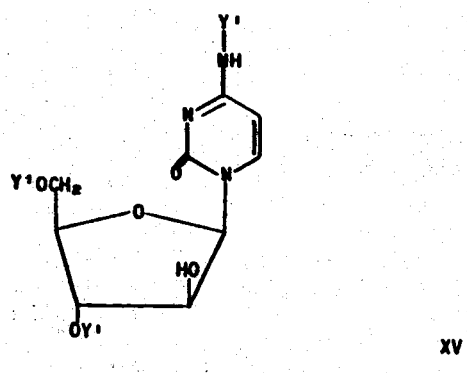

Process D₂

3',5'-Di-O-Esterification Process Using Protonated 2,2'-anhydro-ara-cytidine (XIIb)

A compound of the formula

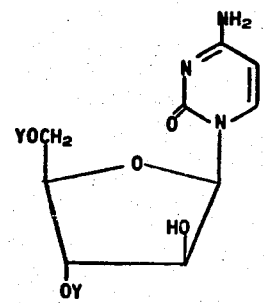

wherein Y has the same meaning as above is prepared by steps comprising 1. acylating a compound of the formula

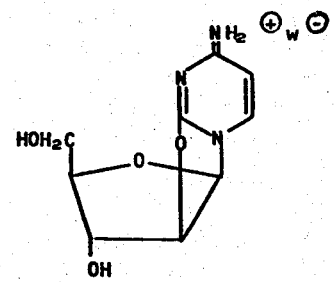

wherein $w^-$ is the anion of a strong acid, with an acylating agent

YOY or $YX_1$ wherein Y and $X_1$ have the same meaning as above, to give a corresponding compound of the formula

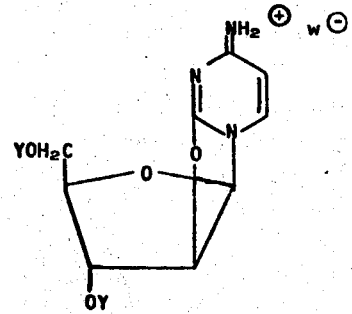

wherein Y and $w^-$ are as given above, 2. hydrolyzing the 2,2'-anhydro linkage to yield a compound of the formula IV or its acid addition salt.

In further detail,

1. In the acylation reaction, the protonated form XIIb of 2,2'-anhydro-ara-cytidine is reacted with an acylating agent, namely a corresponding acyl halide or or anhydride, in a solvent suitable to maintain the anhydro ara-cytidine compound in the protonated form, for example a non-basic solvent, for example dimethylformamide or dimethylacetamide. About 2.1 to about 3.0 moles, preferably about 2.3 moles, of acylating agent should be used per mole of XIIb. The reaction mixture can be warmed, for example to about 55° C., and monitored, for example by thin layer chromatography.

If desired, the intermediate 3',5'-di-(O-acyl)-anhydro-ara-cytidine (XVI) or its $N^4$-amino (i.e., as the free base of the acid addition salt) may be isolated by art methods, such as crystallization or chromatography. However, the compound XVI need not be isolated.

2. The hydrolysis is brought about by reaction with water or alcohol, and tends to occur readily, especially if catalyzed by base, for example by neutralization or mild alkalinization to remove the proton at $N^4$.

The product may be purified by art procedures, for example crystallization or chromatography. The dipalmitate ester, for example, is easily separated by silica gel chromatography using the solvent system methyl ethyl ketone:acetone:water 72:20:8, detecting compounds in the eluate by UV absorbance and identifying them by TLC.

Process E

3'-O-Esterification Process Using Protonated 2,2'-Anhydro-ara-cytidine (XIIb).

A compound of the formula

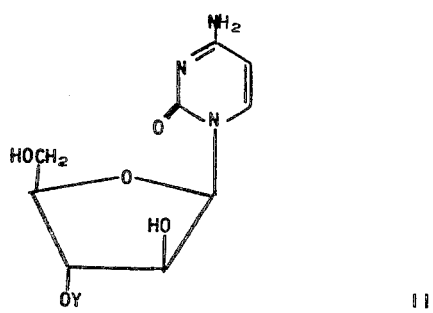

III wherein Y has the same meaning as above is prepared by steps comprising 1. mixing a compound of the formula

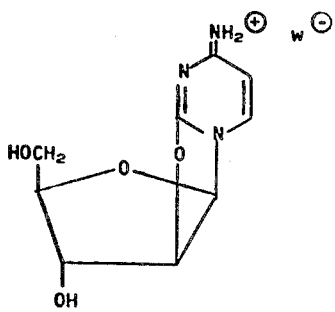

XIIb wherein $w^-$ is an anion of a strong acid, with a triphenylmethyl halide to yield a corresponding compound of the formula

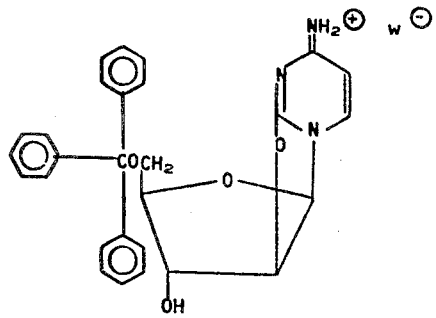

XVII wherein $w^-$ has the same meaning as above;

2. mixing a thus produced corresponding compound resulting from step (1) with a corresponding acylating agent selected from the group consisting of YX₁ or YOY wherein Y has the same meaning as above and $X_1$ is selected from the group consisting of chlorine, bromine and iodine, to yield a corresponding compound of the formula

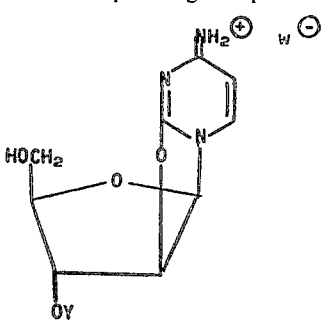

XVIII wherein Y and $w^-$ have the same meaning as above;

3. hydrolyzing at the 5'-O-position of a thus produced corresponding compound resulting from step (2) to yield a corresponding compound of the formula

XIX wherein Y and $w^-$ have the same meaning as above, and 4. hydrolyzing a thus produced corresponding compound resulting from step (3) to yield a corresponding compound of Formula III, above.

In more detail,

1. Approximately equimolar amounts of triphenylmethyl halide, also known as trityl halide, is reacted with an acid addition salt (XIIb) of 2,2'-anhydro-aracytidine. The reaction can be carried out at room temperature with extended reaction times of about one week. The reaction may also be carried out at elevated temperatures of 50° to 70° C. Either triphenylmethyl chloride or the corresponding bromide or iodide can be employed. Although pyridine is an excellent solvent for this reaction, other solvents such as triubutylamine or N,N-dimethylaniline can be used. Upon completion of reaction the solvent is removed.

2. In the second step, the resulting 5'-O-tritylaracytidine acid addition salt, i.e., in the N⁴-protonated form, is reacted with the corresponding acylating agent. In the acylation step it is important that the N⁴-imino group of the cytosine portion of the molecule be maintained in the protonated state as the imine salt of a strong acid, such as hydrochloric acid or sulfuric acid. As reaction solvents, dimethylformamide or dimethylacetamide show good solubility for the products. It is usually not necessary to employ a quantity of solvent sufficient to completely dissolve the product since, as the reaction proceeds, the product will dissolve and the final reaction mixture will be homogeneous. In the case of the acylating agent $YX_1$, i.e., an acyl halide, it is possible to use as $X_1$ either chloride, bromide, or iodide. Acid anhydrides (YOY) can also be used. About 1.0 to about 1.5 moles, preferably about 1.1 moles, of acylating agent should be used per mole of XVII. Usually this reaction proceeds most readily at slightly elevated temperatures such as 40° to 50° C. After removal of the solvent in vacuo using a high-vacuum pump and a water bath at about 45°, the desired intermediate product may be purified by chromatography on silica gel.

3. In the third step the trityl protective group is removed. This selective removal is accomplished most conveniently by the use of an acidic reagent containing about 80 parts of glacial acetic acid and 20 parts of water. Lower proportions of water may be employed, but higher proportions of water may lead to insolubility of the starting material in the reaction mixture, with a resulting heterogeneous and undesirable reaction. The 5'-O-trityl group may also be removed by using a solvent reaction mixture consisting of chloroform containing about 1–3 percent trifluoroacetic acid. Although both reagents may be employed at room temperature or less, the reaction can also be carried out at slightly elevated temperatures. This is particularly true of the reaction employing aqueous acetic acid as a solvent, although in this instance undesirable side reactions are sometimes obtained at elevated temperatures.

The intermediate 2,2'-anhydro-3'-O-esters of aracytidine (XIX) show fair stability in aqueous solution as long as the 4'-imino group remains protonated. In neutral or weakly alkaline solution, the anhydro ring is readily hydrolyzed to yield 3'-O-esters of ara-cytidine. The intermediate anhydro ester XIX can be isolated by methods of the art, for example by chromatography or evaporation and crystallization.

4. In the last step, the 2,2'-anhydro linkage is hydrolyzed by neutralization or mild alkalinizaton, to yield the 3'-O-acyl-ara-cytidine ester III.

The use of 2,2'-anhydro-ara-cytidine (XII) in the synthesis of 3'-O-esters (III) of ara-cytidine is described in Example 8.

All of the invention compounds included within Formulae I through V, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, cyclohexane, chloroform, methanol, ethanol, ethyl acetate, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The water solubility of the monoesters and diesters of this invention can be improved and thus their pharmaceutical versatility is enhanced by conversion to their salt form with pharmaceutically accepted acids which have a pK about or less than 2. These acids can be broadly classed as the strong mineral or organic acids, and this class of acids are appropriate because ara-cytidine and the esters of it which characterize this invention are weak bases. Examples of the strong acids are hydrochloric, sulfuric, phosphoric, glutaric, glutamic, tartaric, trihydroxybenzoic, formic and the like. The salts are formed by suspending the desired ara-cytidine esters in a medium such as methanol and adding appropriately one equivalent of the desired acid. The result is a solution of the acid addition salt, which can be caused to separate by the adding of appropriate media such as diethyl ether. The salts can be purified by recrystallization from solvent mixtures such as methanol-ether. The hydrohalide salt can also be obtained by simply not neutralizing the acylation mixture resulting from the reaction of RCOCl before isolating the acylated product from the solvent.

The compounds of Formulae I to V of this invention are useful as immunosuppressant agents; consequently, their administration is of value in the transplantation of organs in humans and valuable domestic animals, in instances of autoimmune diseases and delayed hypersensitivity. The aforesaid compounds (I to V) are also useful as anti-neoplastic agents of superior therapeutic ratio, exhibiting, particularly, the anti-leukemic activity characteristic of aracytidine; the former also possess the sustained release and oral effectiveness.

The compounds of this invention when administered exhibit the properties characteristic of ara-cytidine, and in addition exhibit the desirable property of sustained release of ara-cytidine over periods of time after administration. Thus the modes of administration and dosages for use are those conventionally used with ara-cytidine. For example, they can be administered orally or intramuscularly. Their use intravenously is feasible, but the need for such disadvantageous devices as the intravenous drip is obviated by the sustained release or "depot" effect of the novel compounds.

In addition, the compounds of this invention exhibit antiphage properties, and, used in conjunction with a deaminase inhibitor, can be used to protect a fermentation threatened with contamination by a phage.

The ester compounds of this invention have the activities and uses that characterize the unesterified compound, cytarabine or ara-cytidine, namely activity against acute leukemia and against lymphosarcoma, as disclosed in U.S. Pat. No. 3,444,294. As in the case of ara-cytidine, sterile injectable solutions such as in cottonseed oil, peanut oil, and sesame seed oil, or dispersions or sterile non-aqueous solutions or dispersions in water, aqueous saline solutions or dispersions suited for extemporaneous preparation of sterile injectable solutions or dispersions can be prepared, using the ester compounds of this invention. Such solutions are prepared by incorporating the ester compound in the solvent or dispersion medium together with appropriate particle coating agents, surfactants, antibacterial or antifungal agents, isotoric agents and the like. Powders can be prepared by freeze-drying such an appropriately prepared solution or dispersion. Dosage unit forms such as vials and ampules are feasible. The dosage depends on age, weight, and severity of condition of the subject, route and frequency of administration, and can vary from 0.1 to about 50 mgs./kg., or a daily total dose of about 3 to about 4000 mgs. given singly or in divided doses. A unit dosage can contain the ester compound of this invention from about 3 to about 1,000 mgs. per unit. This can be from about 0.5 percent to 25 percent w/v of the total composition. Utilizing the sustained release characteristic of the ester compounds of this invention, unit doses can be prepared and administered intramuscularly in amounts varying from about 0.5 to about 10 grams or more total dosage, or from about 10 to about 50 mgs./kg. or more. The amount of ester compound in such dosage can vary up to that indicated as sufficient to aid regression and palliation of the leukemia. Thus a 50 mg./kg. dosage can be given once weekly or doses which can be larger can be administered at wider spaced time intervals.

For oral administration, either solid of fluid unit dosage forms can be prepared. For preparing solid compositions such as tablets, the principal active ingredient is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Tablets can be enterically coated or uncoated. Wafers are prepared in the same manner as tablets, differing only in shape and the inclusion of sucrose or other sweetener and flavor. In their simplest embodiment, capsules, like tablets, are prepared by mixing the active compound of the formulation with an inert pharmaceutical diluent and filling the mixture into a hard gelatin capsule of appropriate size. In another embodiment, capsules are prepared by filling hard gelatin capsules with polymer coated beads containing the active compound. Soft gelatin capsules are prepared by machine encapsulation of a slurry of the active compound with an acceptable vegetable oil, light liquid petrolatum or other inert oil.

Fluid unit dosage forms for oral administration such as syrups, elixirs, and suspensions can also be prepared. The water-soluble forms of the active compound can be dissolved in an aqueous vehicle together with an aromatic flavoring agent. Suspensions can be prepared of the insoluble forms with a syrup vehicle with the aid of a suspending agent such as acacia, tragacanth, methylcellulose and the like.

DETAILED DESCRIPTION

It is to be understood that the invention is not to be limited to the exact details of operation or exact compounds shown and described herein, as obvious modifications and equivalents will be apparent to one skilled in the art, and the invention is therefore to be limited only by the scope of the appended claims.

Preparation 1

$N^4$-Trichloroethoxycarbonyl-5'-O-trityl-ara-cytidine (VII)

A 193.69g. (.40M) sample of 5'-O-trityl-ara-cytidine (VI) (also named 5'-O-triphenylmethyl-ara-cytidine and prepared as in Example 6 of U.S. Pat. No. 3,284,440) is dissolved in 4 l. of freshly distilled anhydrous pyridine. The solution is cooled to 3° C. and treated with 84.4 g. (.40M) of trichloroethoxycarbonyl chloride. The solution is stirred at 3° C. for about 4 hours and then allowed to come to 25° C. over ca. 18 hours. The pyridine is distilled at 40° C. in vacuo and the gummy residue treated with 1 l. of methylene chloride. A solid (23.7) separates and is removed by filtration. Thin layer chromatography (TLC) shows the material to be starting material. The methylene chloride solution is washed 3 times with 0.1 N hydrochloric acid and once with saturated salt solution. After drying over sodium sulfate the methylene chloride is allowed to slowly evaporate, whereupon crystals are deposited. The crystals are collected by filtration, washed with cold methylene chloride and dried giving 64.5 g. of desired product (VII). TLC of the methylene chloride mother liquors show spots moving faster than the product which are probably materials acylated at 2'-O and 3'-O position. These are hydrolyzed by treating the mother liquor residue with 1 l. of tetrahydrofuran and 1 l. of 0.3 N sodium hydroxide. After 1.5 hours all the faster moving TLC spots have disappeared. The reaction is acidified to pH 6.5 with concentrated hydrochloric acid. The tetrahydrofuran is distilled in vacuo and the aqueous residue extracted with methylene chloride. The methylene chloride is washed and dried as above and again set out to evaporate. Again crystals are deposited. These are collected and washed giving 42.5 g. of product. The mother liquors are evaporated further and deposit another 45.5 g. of material which this time is about one-half product and one-half starting material as seen by TLC. The 45.5 g. is heated with 500 ml. of acetone and the residual material removed by filtration. This is found to be 5'-O-trityl-ara-cytidine (VI). The acetone mother liquors are evaporated to dryness and crystallized from methylene chloride by slow evaporation giving 19 g. of product (VII). The total yield is thus 126 g. of $N^4$-trichloroethoxycarbonyl-5'-O-trityl-ara-cytidine (VII) or 48 percent of theory. A sample is prepared for analysis by crystallizing it twice from methylene chloride.

Anal.
Calcd. for $C_{31}H_{23}Cl_3N_3O_7$:
        C, 56.30; H, 4.27; Cl, 16.11; N, 6.36.
Found:  C, 56.46; H, 4.30; Cl, 15.25; N, 7.26.

Ultraviolet Spectrum $[\lambda_{max}^{EtOH}\ m\mu\ (\epsilon \times 10^{-3})]$: 232 (11.8), 296 (5.38).

Infrared Spectrum ($\nu$ mull): 3380, 3200, 3120 sh, 1765, 1650, 1620, 1570, 1505, 1330, 1245, 1200, 1100, 1085, 1065, 810, 785, 770, 750, 740, 715, and 705.

EXAMPLE 1

2'-O- and 3'-O-Palmityl-ara-cytidine (I and III)

To a solution of 19.8 g.(30 mmoles) of $N^4$-trichloroethoxycarbonyl-5'-O-trityl-ara-cytidine (VII) (obtained as in Preparation 1) in 150 ml. of anhydrous pyridine, 15 g. (30.3 mmoles) of palmitic anhydride is added. The mixture is stirred for about 16 hours at room temperature and a clear solution results. The clear reaction mixture is checked by TLC using silica gel and ethyl acetate solvent system In this system two products, $R_f$ 0.89 and 0.75 appear, together with some starting material ($R_f$ 0.26). An additional 1.4 g. (2.8 moles) of palmitic anhydride is added and the reaction continued for 24 hours at room temperature. The reaction mixture is concentrated in vacuo to yield about 39.3 g. of syrupy residue. The syrup is dissolved in 500 ml. of ether and washed with 300 ml. of 1 percent sodium bicarbonate solution (3 g. sodium bicarbonate equals 36 mmoles). The ether layer is further washed with three 70-ml. portions of water, dried over 70 g. of anhydrous sodium sulfate and again concentrated in vacuo to 34.9 g. of syrupy residue. The residue is again checked by TLC with another solvent system (cyclohexane-ethyl acetate -1:1). In this system there is obtained a fast moving spot ($R_f$0.78), a double spot ($R_f$0.39) which shows as two components not completely separated, and some starting compound (VII), $R_f$0.02.

The 34.8 g. of crude product is adsorbed on 2.5 kg. of silica gel and eluted with ethyl acetate, collecting 200 ml. fractions after elution of the reaction products begins. Fractions 1 through 3 contain only 2'-O-, 3'-O-dipalmityl-N-$^4$-trichloroethoxycarbonyl-5'-O-trityl-ara-cytidine (X) ($R_f$ 0.79, ethyl acetate:cyclohexane -1:1). Evaporation in vacuo yields about 3.9 g. of syrupy residue. This residue can be further treated as described in Example 9 to afford 2',3'-di-O-palmityl-ara-cytidine (v).

Fractions 4 through 30 are checked by TLC in the solvent system ethyl acetate:cyclohexane —1:1 and show a mixture of three components. The combined fractions on evaporation yield 17.5 g. of syrupy residue. An additional chromatography purification step, using a column of 2.5 kg. of silica gel (silicic acid) and eluting with ethyl acetate:cyclohexanone, is carried out. After about 8 l. of this solvent mixture is passed through the column, the products begin to be eluted. At this point 100 ml. fractions are collected. Fraction 1 through 60 contain about 7.67 g. of 2'-O-, 3'-O-dipalmityl-N$^4$-trichloroethoxycarbonyl-5'-O-ara-cytidine (X). At this juncture ethyl acetate is used for elution and fractions 71 through 83 are collected. These fractions are principally a mixture of 2'-O-palmityl-N$^4$-trichloroethoxy-carbonyl-5'-O-trityl-ara-cytidine (VIII) and 3'-O-palmityl-N$^4$-trichloroethoxycarbonyl-5'-O-trityl-ara-cytidine (IX). Fractions 71 through 83 on evaporation in vacuo yield about 7.05 g of a mixture of the two immediately preceding named compounds with some 2'-O-, 3'-O-dipalmityl-N$^4$-trichloroethoxycarbonyl-5'-O-trityl-ara-cytidine (X).

Fractions 71 through 83 are adsorbed on a column of 500 g. of silica gel and eluted with 20 percent ethyl acetate-80 percent cyclohexane. After several liters of solvent are passed through the column, some of the faster moving dipalmityl derivative begins to be eluted, and the eluate is collected in 25-ml. fractions. Fractions 1 through 120 are principally 2'-O-, 3'-O-dipalmityl-N$^4$-trichloroethoxycarbonyl-5'-O-trityl-ara-cytidine (X). Fractions 120 through 440 contain some of the dipalmityl compound and a trace of impurity. Fractions 540 through 555 are combined and yield 2.31 g. of essentially pure 3'-O-palmityl-N$^4$-trichloroethoxycarbonyl-5'-O-trityl-ara-cytidine (IX) (R$_f$ 0.65, solvent system, ethyl acetate:cyclohexane — 1:1, silica gel plates). Fractions 667–685 from the same column are combined and yield 0.668 g. of 5'-O-trityl-N$^4$-trichloroethoxycarbonyl-2'-O-palmityl-ara-cytidine (VIII) with traces of the corresponding 3'-O-palmityl material. Fractions 686–717 are combined and yield 2.07 g. of pure 5'-O-trityl-N$^4$-trichloroethoxycarbonyl-2'-O-palmityl-ara-cytidine (VIII) (R$_f$ 0.62, in solvent system cyclohexane:ethyl acetate:95 percent ethanol — 5:3:1).

All of the 2.31 g. of 3'-O-palmityl-N$^4$-trichloroethoxy-carbonyl-5'-O-trityl-ara-cytidine (IX) is dissolved in 20 percent water-80 percent glacial acetic acid and 3 g. of zinc dust is added. The mixture is stirred for about 16 hours at room temperature and then the zinc is removed by filtration. The clear filtrate gives a single spot by TLC which turns yellow when sprayed with dilute sulfuric acid after heating. Since this material still contains the 5'-O-trityl substituent, the clear filtrate is heated for about 6 hours on a steam bath, whereupon the test on a TLC plate with dilute sulfuric acid shows the absence of a trityl group in the product. The clear reaction mixture is concentrated in vacuo and the residual solid purified by adsorption on 200 g. of silica and eluted, first with chloroform:methanol —98:2 and then with methylethylketone:acetone:water — 72:20:8. Twenty 30-ml. fractions are collected. Fractions 2 through 16 are combined and concentrated in vacuo to a solid. The solid is crystallized from methanol and then acetone to yield 3'-O-palmityl-ara-cytidine (III) having a melting point of 174° to 176° C.

Anal.
Calcd. for C$_{25}$H$_{43}$O$_6$N$_3$:  C, 62.3; H, 9.0; N, 8.7.
Found:  C, 61.8; H, 8.3; N, 8.1.

U. V. absorption spectrum: 215 mμ (slight shoulder), ε = 10,200; 230 mμ (steep shoulder), ε = 7,900; 272 mμ, ε = 9,100.

0.89 g. of 5'-O-trityl-N$^4$-trichloroethoxycarbonyl-2'-O-palmityl-ara-cytidine (VIII) is dissolved in 50 ml. of glacial acetic acid:H$_2$O - 80:20. Zinc dust (2g.) is added and the mixture is stirred overnight at room temperature. TLC analysis shows that hydrolysis of the 5'-O-trityl- and N$^4$-trichloroethoxycarbonyl groups (VIII) is complete. The zinc is removed by filtration and the filtrate is concentrated to dryness in vacuo. The residue is dissolved in a solvent mixture of methyl ethyl ketone:acetone:H$_2$O — 72:20:8, adsorbed on 200 g. of silica gel and eluted with the same solvent system. As soon as material begins to be eluted from the column (UV), the eluant is collected in 50-ml. fractions. Fraction 8–14 contain the desired product. These fractions are commbined, evaporated in vacuo, and the solid residue recrystallized from acetone to yield 125 mgms of 2'-O-palmityl-ara-cytidine (II), M, Pt. = 133°–134°.

Anal.
Calcd. for C$_{25}$H$_{43}$O$_6$N$_3$.H$_2$O:
  C, 60.09; H, 9.08; N, 8.41.
Found:  C, 60.07; H, 8.90; N, 8.69.
UV:  236 mμ ε = 7,300.
  270 mμ ε = 7,850.

Following the procedure of Example 1 but substituting for palmitic anhydride other acylating agents, such as 1. acetic anhydride,
2. pivalyl chloride,
3. oleyl chloride,
4. nicotinyl chloride,
5. 1-naphthoyl chloride,
6. 1-adamanntaneacetyl chloride,
7. cyclobutane carboxylic acid anhydride,
8. picolinyl chloride,
9. trans-3-n-propylhygric acid chloride,
10. succinic anhydride,
11. 3,3-dimethylglutaric anhydride,
12. itaconic anhydride,
13. aconitic anhydride, etc., yields, respectively, 1. 3'-O-acetyl-ara-cytidine (III),
2. 3'-O-pivalyl-ara-cytidine (III),
3. 3'-O-oleyl-ara-cytidine (III),
4. 3'-0-nicotinyl-ara-cytidine (III),
5. 3'-O-1-naphthoyl-ara-cytidine (III),
6. 3'-O-(1-adamantaneacetyl)-ara-cytidine (III),
7. 3'-O-cyclobutane carbonyl-ara-cytidine (III),
8. 3'-O-picolinyl-ara-cytidine (III),
9. 3'-O-trans-3-(n-propyl)-hydroyl-ara-cytidine (III),
10. 3'-O-succinyl-ara-cytidine (III),
11. 3'-O-(3,3-dimethyl-glutaryl)-ara-cytidine (III),
12. 3'-O-itaconyl-ara-cytidine (III),
13. 3'-O-aconityl-ara-cytidine (III), etc.

and the corresponding 2'-O acylates (I) of ara-cytidine.

EXAMPLE 2

2'-O- and 3'-O-Stearyl-ara-cytidine (I and III) To a solution of 19.8 g. (30 m moles) of N$^4$-trichloroethoxycarbonyl-5'-O-trityl-ara-cytidine (VII) in 150 ml. of anhydrous pyridine, 17 g. (30.8 m moles) of stearic anhydride is added. The mixture is stirred at room temperature, and after about 5.5 hours most of the stearic anhydride undergoes reaction with only a small quantity of insoluble material remaining. After about 48 hours of stirring, some insoluble stearic anhydride is present and the reaction mixture is warmed for about 2 hours at about 50°C. Reaction of all of the stearic anhydride has taken place but TLC tests (chloroform:methanol —95:5 solvent system( still show a small amount of starting material (VII) and three other components in the reaction mixture.

The reaction mixture is concentrated in vacuo to a solid residue which is dissolved in 100 ml. of ethyl acetate and concentrated again in vacuo to remove excess pyridine. The ethyl acetate treatment and concentration in vacuo is repeated twice, and the resulting residue then dissolved in 300 ml. of ether. Approximately 2.9 g. of insoluble material is removed. The clear ether solution is extracted successively with 300-ml. and 150-ml. portions of freshly prepared 1 percent sodium bicarbonate solution to remove stearic acid, and the ether layer dried over 75 g. of anhydrous sodium sulfate. After filtering the sodium sulfate the clear ether filtrate is concentrated in vacuo to yield 33.1 g. of residual solid. A portion is checked by TLC (solvent system — chloroform: methanol — 98.2) and shows 3 different product spots at $R_f$ 0.53, 0.15, and 0.07.

The mixture of products is separated by elution chromatography on 2.5 kg. of silica gel, using 98 percent methylene chloride — 2 percent methanol as solvent (chromatography A). After collecting about 13 liters of solvent that is passed through the column, the reaction products begin to be eluted and thirty 120-ml. fractions are collected. Fractions 1 through 4 comprise mostly 2'-O, 3'-O-distearyl-$N^4$-trichloroethoxycarbonyl-5'-O-trityl-ara-cytidine (X) which on evaporation yield 6.27 g. of material. Fractions 5 through 18 contain a mixture of 3'-O-stearyl-$N^4$-trichloroethoxycarbonyl-5'-O-trityl-ara-cytidine (IX) and 2'-O-stearyl-$N^4$-trichloroethoxycarbonyl-5'-O-trityl-ara-cytidine (VIII) and some 2'-O-, 3'-O-distearyl-$N^4$-trichloroethoxycarbonyl-5'-O-trityl-ara-cytidine (X). On evaporation these fractions yield about 16.76 g. of material. Fractions 19 through 30 contain about 0.5 g. of product which proves to be a mixture of 2'-O-stearyl-$N^4$-trichloroethoxycarbonyl-5'-O-trityl-ara-cytidine (VIII) and some slower moving components.

The material from fractions 5 through 18 weighing 16.76 g. is further purified by elution chromatography from 1 kg. of silica gel, using first about 10 l. of methylene chloride and then 8 l. of 99 percent methylene chloride — 1 percent methylene (chromatography B). At this time elution of the products begins (UV) and 22-ml. fractions are collected. About 250 fractions are collected and checked by TLC (solvent system, chloroform:methanol — 98.2). Fractions 1 and 2 are mostly the disubstituted derivative 2'-O-, 3'-O-distearyl-$N^4$-trichloroethoxycarbonyl-5'-O-trityl-ara-cytidine (X). Fractions 3 through 50 are a mixture of this distearyl material (X) and the monostearate, 3'-O-stearyl-$N^4$-trichloroethoxycarbonyl-5'-O-trityl-ara-cytidine (IX). On evaporation these fractions yield 6.4 g. of material. Fractions 51 through 70 are quite pure 3'-O-stearyl-$N^4$-trichloroethoxycarbonyl-5'-O-trityl-ara-cytidine (IX). Evaporation yields 720 mg. Fractions 71 through 90 are also this compound (IX); which on evaporation yields 380 mg. Fractions 91 through 220 are a mixture of the two monostearates, 3'-O-stearyl-$N^4$-trichloroethoxycarbonyl-5'-O-trityl-ara-cytidine (IX) and 2'-O-stearyl-$N^4$-trichloroethoxycarbonyl-5'-O-trityl-ara-cylidine (VIII). Fractions 3 through 50 weighing 6.4 g. are rechromatographed on silica gel and eluted first with chloroform containing 0.75 percent ethanol to remove most of the 2'-O-, 3'-O-distearyl-$N^4$-trichloroethoxycarbonyl-5'-O-trityl-ara-cytidine (X) and then with 2.75 percent ethanol —97.25 percent chloroform to yield 3'-O-stearyl-$N^4$-trichloroethoxycabonyl-5'-O-trityl-ara-cytidine (IX). All fractions are checked by TLC and those containing the desired prodcut (IX) are combined.

The pooled 3'-O-stearyl-$N^4$-trichloroethoxycarbonyl-5'-O-trityl-ara-cytidine (IX) weighing 1.36 g. is dissolved in 50 ml. of chloroform containing 2 percent by volume of trifluoroacetic acid and the reaction mixture allowed to stand for about 3.5 hours at room temperature. TLC shows no starting material remaining, indicating complete removal of the 5'-O-trityl group. The reaction mixture is washed twice with 100 ml. portions of freshly prepared saturated sodium bicarbonate solution, dried over sodium sulfate and concentrated in vacuo. The $N^4$-trichloroethoxycarbonyl group is removed by dissolving the residue in 100 ml. of methanol and refluxing with 2 g. of zinc for about 0.5 hour. After filtering off the zinc, the solution is evaporated in vacuo to yield crude 3'-O-stearyl-ara-cytidine (III). The product is purified by chromatography on silica gel. After elution of impurities with chloroform and 2 percent methanol —98 percent chloroform the desired compound (III) is eluted with 5 percent methanol —95 percent chloroform, collecting 50-ml. fractions. Fractions 4 through 8 are combined, and after recrystallization from acetone yield the purified 3'-O-stearyl-ara-cytidine (III).

| Anal. | | |
|---|---|---|
| Calcd. for $C_{27}H_{47}O_6N_3$: | | C, 63.62; H, 9.30; N, 8.24. |
| | Found: | C, 63.30; H, 9.18; N, 8.47. |
| UV: 215 m$\mu$ | slight shoulder | |
| 230 m$\mu$ | $\epsilon = 7,900$ (shoulder) | |
| 272 m$\mu$ | $\epsilon = 9,100$ (shoulder) | |

Fractions 19 to 30 of chromatography A and 91 to 220 of chromatography B are joined and evaporated. The resulting material is rechromatographed as in chromatography B and fractions containing essentially only VIII (free from IX and X) are separated. The protecting groups $N^4$-trichloroethoxycarbonyl and 5'-O-trityl are removed as for the 3'-O-stearyl monoester (IX). The crude product (III) is purified as above to yield purified 2'-O-stearyl-ara-cytidine (I).

Following the procedure of Example 2 but substituting for stearic anhydride other acylating agents, such as
  1. propionic anhydride,
  2. valeric anhydride,
  3. trifluoroacetic anhydride,
  4. phenylacetic anhydride,
  5. p-anisoyl chloride,
  6. 2-furoyl chloride,
  7. 4-thianaphthene acetyl chloride,
  8. coumaryl chloride,
  9. fumaryl chloride,
  10. adipic anhydride, etc.,
yields, respectively, 1. 3'-O-propionyl-ara-cytidine (III),
2. 3'-O-valeryl-ara-cytidine (III),
3. 3'-O-trifluoroacetyl-ara-cytidine (III),
4. 3'-O-phenylacetyl-ara-cytidine (III),
5. 3'-O-p-anisoyl-ara-cytidine (III),
6. 3'-O-1-furoyl-ara-cytidine (III),
7. 3'-O-4-thianaphthene acetyl-ara-cytidine (III),
8. 3'-O-coumalyl-ara-cytidine (III),
9. 3'-O-fumaryl-ara-cytidine (III),
10. 3'-O-adipyl-ara-cytidine (III), etc.

and the corresponding 2'-O-acylates (I).

EXAMPLE 3

3'-O-Benzoyl-ara-cytidine (III)

To a solution of 6.6 g. (10 mmoles) of $N^4$-trichloroethoxycarbonyl-5'-O-trityl-ara-cytidine (VII) in 75 ml. of anhydrous pyridine, 2.8 g. (12.4 mmoles) of benzoyl chloride is added. The mixture is stirred at room temperature for about 16 hours, then an additional 0.5 g. of benzoyl chloride in 10 ml. of anhydrous pyridine is added. The stirring is continued for about 4.5 hours at 50° to 55° C., cooled to room temperature and stirred for about 16 more hours. The solution is concentrated in vacuo to a thin syrup. This material is dissolved in ethyl acetate and concentrated in vacuo. This procedure is repeated twice and the crude residual material weighing 10.3 g. dissolved in 12 ml. of ethyl acetate. On standing at room temperature, 1.43 g. of the starting material (VII) is recovered as a crystalline solid. The filtrate is a mixture of at least three components, including some starting material (VII). Chromatography on silica gel using ethyl acetate:cyclohexane (80:20) removes the starting material (VII) to yield 5.08 g. of material showing essentially two components, $R_f$ 0.66 and 0.75 by TLC (ethyl acetate solvent system silica gel). This material is chromatographed on silica gel with elution by ethyl acetate-cyclohexane (40:60), collecting 15-ml. fractions. Tubes 140 through 210 contain 2'-O-, 3'-O-dibenzoyl-$N^4$-trichloroethoxycarbonyl-5'-O-tritylara-cytidine (X) and tubes 310 through 360 contain 2'-O-benzoyl-$N^4$-trichloroethoxycarbonyl-5'-O-trityl-ara-cytidine (VIII) and 3'-O-benzoyl-$N^4$-trichloroethoxycarbonyl-5'-O-trityl-ara-cytidine (IX). Additional chromatography on silica gel separates the 3'-O-benzoyl-$N^4$-trichloroethoxycarbonyl-5'-O-trityl-ara-cytidine (IX), which moves just ahead of the corresponding 2'-O-benzoyl compound VIII. If desired, the fractions containing VIII can also be collected separately and processed further in the same manner as below to yield 2'-O-benzoyl-ara-cytidine (I).

The purified 3'-O-benzoyl-$N^4$-trichloroethoxycarbonyl-5'-O-trityl-ara-cytidine (IX) is treated with 80 percent acetic acid — 20 percent water to remove the trityl group and give 3'-O-benzoyl-$N^4$-trichloroethoxycarbonyl-ara-cytidine (IX'). This treatment is followed by reaction with zinc in refluxing methanol to remove $N^4$-trichloroethoxycarbonyl group; the resulting crude material (III) is purified by chromatography on a silica gel column, eluting first with cyclohexane: ethyl acetate:95% ethanol (5:3:1) and then with methyl ethyl ketone:acetate:water (72:20:8). The desired fractions are combined, evaporated to a solid residue and recrystallized from acetone to yield the purified 3'-O-benzoyl-ara-cytidine (III) having a melting point of 208° to 210° C. (with slight decomposition).

Anal.
Calcd. for $C_{16}H_{17}O_3N_3$: C, 55.33; H, 4.93; N, 12.10.
Found: C, 55.26; H, 5.08; N, 12.28.

UV: 231 mµ  ε = 21,600.
272 mµ  ε = 10,700.

Following the procedure of Example 3 but substituting for benzoyl chloride other acylating agents, such as
1. p-nitrobenzoyl chloride,
2. o-toluoyl chloride,
3. 2,4,6-trimethylbenzoyl chloride,
4. 3,4,5-trimethoxybenzoyl chloride,
5. 2,6-dimethylbenzoyl chloride, etc., yields, respectively,
1. 3'-O-p-nitrobenzoyl-ara-cytidine (III),
2. 3'-O-o-toluoyl-ara-cytidine (III),
3. 3'-O-2,4,6-trimethylbenzoyl-ara-cytidine (III),
4. 3'-O-3,4,5-trimethoxybenzoyl-ara-cytidine (III),
5. 3'-O-2,6-dimethylbenzoyl-ara-cytidine (III), etc.

and, if desired, the corresponding 2'-O-acylates of ara-cytidine (I).

EXAMPLE 4

2'-O-, 3'-O- and 2',3'-di-O-Methoxycarbonylara-cytidine (I, III and V)

To a solution of 6.6 g. (10 mmoles) of $N^4$-trichloroethoxycarbonyl-5'-O-trityl-ara-cytidine (VII) in 25 ml. of anhydrous pyridine, 1 g. (about 10.6 mmoles) of methyl chloroformate is added. The mixture is stirred at room temperature for about 16 hours. The solvent is evaporated in vacuo, the residue dissolved in ethyl acetate and then chromatographed on a column of silica gel. After removal of the 2'-O-, 3'-O-di(methoxycarbonyl)-$N^4$-trichloroethoxycarbonyl-5'-O-trityl-ara-cytidine (X') as a fast moving component (Point A), the 2'-O-methoxycarbonyl-$N^4$-trichloroethoxycarbonyl-5'-O-trityl-ara-cytidine (VIII') and 3'-O-methoxycarbonyl-$N^4$-trichloroethoxycarbonyl-5'-O-tritylara-cytidine (IX) are eluted as a mixture and rechromatographed to achieve separation (Point B). The purified 3'-O-methoxycarbonyl-$N^4$-trichloroethoxycarbonyl-5'-O-tritylara-cytidine (IX') is hydrolyzed at the 5'-position by mixing it with about 100 ml. of 80 percent acetic acid — 20 percent water at room temperature. The resulting 3'-O-methoxycarbonyl-$N^4$-trichloroethoxycarbonyl-ara-cytidine (IX") is dissolved in about 50 ml. of methanol and refluxed with about 1 g. of zinc dust until the trichloroethoxycarbonyl group on the $N^4$-position is removed. The progress of the reaction is followed by TLC. When the reaction is complete the zinc is removed by filtration and the filtrate concentrated in vacuo to yield a solid residue. The product is recrystallized from boiling methanol to yield pure 3'-O-methoxycarbonylara-cytidine (III).

The 2',3'-di-O derivative X'at Point A and the 2'-O-derivative VIII' at Point B are further treated individually (as for the 3'-O derivative IX') to afford purified 2',3'-di-O-methoxycarbonyl-ara-cytidine (V) and 2'-O-methoxycarbonyl-ara-cytidine (I).

Following the procedure of Example 4 but substituting for methyl chloroformate other acylating agents, such as 1. ethyl chloroformate,
2. carbobenzoxy chloroformate,
3. octyl chloroformate,
4. palmityl chloroformate,
5. phenyl chloroformate, etc., yields, respectively, 1. 3'-O-ethoxycarbonyl-ara-cytidine (III),
2. 3'-O-carbobenzoxycarbonyl-ara-cytidine (III),
3. 3'-O-octyloxycarbonyl-ara-cytidine (III),
4. 3'-O-palmityloxycarbonyl-ara-cytidine (III),
5. 3'-O-phenyloxycarbonyl-ara-cytidine (III), etc.

and the corresponding 2'-O- and 2',3'-di-O-acylates of aracytidine.

EXAMPLE 5A

3'-O-, 5'-O-dipalmityl-ara-cytidine (IV)

A suspension of 200 g. (0.72 moles) of the known compound ara-cytidine hydrochloride (XIa) in 1.5 l. of dimethylacetamide is stirred until most of the solid dissolves; 393 g. (1.43 moles) of palmityl chloride is added dropwise during about 1 hour and the reaction mixture stirred at room temperature for about 16 hours. A thick white slurry results and is poured into 6 l. of ethyl acetate:ether (1:1). This dense material (IVa) is filtered, washed with ethyl acetate:ether (1:1), then with ether and dried in vacuo to give 370 g. of crude solid. This material (IVa) is stirred with 4 l. of 0.5 N sodium bicarbonate solution for about 2 hours, filtered, washed thoroughly with water and sucked dry on the filter. The crude cake is recrystallized from 5 l. of boiling methanol and after refrigeration for about 16 hours, 180 g. of solid is obtained. About 10.5 g. of this material is again recrystallized from 700 ml. of boiling methanol to give 6.4 g. of partially purified 3'-O-, 5'-O-dipalmityl-ara-cytidine (IV) having a main component ($R_f$ about 0.45 in the chloroform:methanol - 9:1 solvent system, silica gel plates) and an impurity ($R_f$ 0.87 in the chloroform:methanol — 9:1 solvent system, silica gel plates). This material (weighing 4.5 g.) is purified by column chromatography using an eluting solvent of 99.25 percent chloroform — 0.75 percent ethanol until solid material begins to be eluted from the column. The solvent system is then changed to 98 percent chloroform — 2 percent ethanol and 70 ml. fractions are collected. Fractions 1 through 22 containing material with $R_f$ 0.87 is discarded. Fractions 36 through 60 contain very little of the desired material and the eluting solvent is changed to 3 percent ethanol — 97 percent chloroform and finally to 5 percent ethanol — 95 percent chloroform before the desired product IV begins to be eluted. The recovered product IV weighs 3.2 g. About 2.2 g. of it is recrystallized from 110 ml. of boiling methanol and upon cooling yields 2.1 g. of 3'-O-, 5'-O-dipalmityl-ara-cytidine (IV), having a melting point of 111° to 112° C. (shrinks at 88°, becomes glassy at 98° C. and then flows down sharply at 111° to 112° C.).

---

Calculated for $C_{41}H_{73}O_7N_3$:
Calculated: C, 68.39; H, 10.22; N, 5.84.
Found: C, 68.37; H, 10.21; N, 5.97.

---

$R_f$ 0.42 (solvent system, chloroform:methanol — 9:1, silica gel plates). The structure of the compound is confirmed by its nuclear magnetic resonance (NMR) spectrum.

Following the procedure of Example 5 but substituting for palmityl chloride other acylating agents, such as
1. isobutyryl chloride,
2. octanoyl chloride,
3. stearyl chloride,
4. β-chloropivaloyl chloride,
5. p-toluoyl chloride,
6. tetrahydrofuroyl chloride,
7. isonicotinyl chloride, etc., yields, respectively, 1. 3'-O-, 5'-O-diisobutyryl-ara-cytidine (IV),
2. 3'-O-, 5'-O-dioctanoyl-ara-cytidine (IV),
3. 3'-O-, 5'-O-distearyl-ara-cytidine (IV),
4. 3'-O-, 5'-O-di(β-chloropivaloyl)-ara-cytidine (IV),
5. 3'-O-, 5'-O-di(p-toluoyl)-ara-cytidine (IV),
6. 3'-O-, 5'-O-ditetrahydrofuranoyl-ara-cytidine (IV),
7. 3'-O-, 5'-O-diisonictoninyl-ara-cytidine (IV), etc.

EXAMPLE 5B

Following the procedure of Example 5A but with careful monitoring, for example, by UV absorptivity on silica gel TLC as previously described, the diacylates produced in the acylation reaction are observed to be eluted in two successive close peaks. The material from the first peak is 3',5'-di-O-palmityl-ara-cytidine, and that of the last peak is 2',5'-di-O-palmityl-ara-cytidine. The 2', 5'-di-O-palmityl-ara-cytidine fractions are separated and processed further according to the procedure for the 3', 5'-di-O-ester, Example 5A, to afford 2',5'-di-O-palmitylara-cytidine.

EXAMPLE 6

3',5'-Di-(O-palmityl)-ara-cytidine (IV) from protonated 2,2'anhydro-ara-cytidine (XIIb)

2,2'-anhydro-ara-cytidine hydrochloride (XIIb) (1.3g.) is suspended with stirring in 50 ml. of dimethylacetamide, and a solution of palmityl chloride (3.0 g.) in 25 ml. of dimethylacetamide is added. The mixture is stirred for about 160 hours at a temperature of 55°. About 0.2 g. of insoluble material is removed by filtration, and the filtrate is concentrated in vacuo to a solid residue. Chromatography on silica gel using the solvent system methyl ethyl ketone:acetone:water 72:20:8 permits the separation of 3'-O, 5'-O-dipalmityl-ara-cytidine (IV) from three other components in the reaction mixture having lower $R_f$ values.

EXAMPLE 7

3',5'-Di-(O-benzoyl)-ara-cytidine (IV) from 2,2'-anhydro-ara-cytidine (XIIa).

2,2'-anhydro-ara-cytidine (XIIa) (5.22 g.) is suspended in 160 ml. of anhydrous pyridine with stirring. Benzoyl chloride (9 gm.) is added dropwise with stirring during about 2 hours. The solid gradually reacts and after 16 hours a clear solution has resulted. In order to complete the reaction, the solution is heated on the steam bath for 1.75 hours and yields principally a single spot with an $R_f$ of 0.72 ($CHCl_3$:MeOH 90:10). The reaction mixture is evaporated in vacuo to remove pyridine. The residue is dissolved in absolute ethanol and evaporated again to remove traces of pyridine. The procedure is repeated three times. The resulting semisolid is slurried with 50 ml. of methanol and filtered. The solid is washed once with cold methanol and then recrystallized from boiling methanol. Wt. = 4.33 g., M. Pt. 197.5°–198.5°. An additional 2.95 g. is recovered from the various filtrates. This material analyzed correctly for 3'-O, 5'-O, -N$^4$-tribenzoyl-aracytidine hydrate (XV). 3'-O, 5'-O, N$^4$-Tribenzoyl-aracytidine hydrate (1.5 gm.) is dissolved in 15 ml. of a 4:1-pyridine:acetic acid and 0.45 ml. of hydrazine hydrate is added. The solution is stirred for 1 hour at room temperature and then refrigerated overnight. The solvent is evaporated and the residue chromatographed on silica gel using $CH_2Cl_2$:MeOH 95:5. The fractions containing the desired product are combined and recrystallized from methanol:water to yield 538 mg. of 3'-O, 5'O-dibenzoyl-ara-cytidine hydrate (IV), M.P. 247°–248°C. (dec.). A small amount of yellow material is removed by an additional chromatography as described above. The purified 3'-O, 5'-O-dibenzoylara-cytidine hydrate (IV) crystallized as fine white needles and melted at 247°–248° C. (dec.).

Calculated for $C_{23}H_{21}O_7N_3.H_2O$:
                Calculated: C, 58.84; H, 4.94;
                            N, 8.95.
                Found: C, 59.28; H, 4.61;
                       N, 9.11.

UV spectrum (Et OH)

| m$\mu$ | $\epsilon$ |
|---|---|
| 232 | 32,000 |
| 268 (Broad max.) | 9,850 |
| 282 (sl. shoulder) | 6,950 |

NMR: Conforms to structure

EXAMPLE 8

3'-O-Palmityl-ara-cytidine (III) from 2,2'-anhydro-ara-cytidine (XIIb)

26.07 g. (0.1 moles) of 2,2'-anhydro-ara-cytidine hydrochloride (XIIb) is mixed with 500 ml. of pyridine. Approximately 30.7 gm. (0.11 moles) of triphenylchloromethane are added and the mixture stirred at room temperature for about 120 hours. The excess solvent is removed in vacuo, and the residue thoroughly triturated with benzene several times with decantation to remove excess triphenylchloromethane and pyridine. The residue is then dissolved in dry dimethylformamide, and the dimethylformamide is then evaporated in vacuo (pressure less than 1 mm.) to remove the residual benzene. The resulting crude 5-O-trityl-2,2'-anhydro-ara-cytidine hydrochloride (XVII) is mixed with dry dimethylformamide (300 mg.) and palmitoyl chloride (30.24 gm., 0.11 moles), dissolved in 200 ml. of dry dimethylformamide, is added dropwise during 2 hours. The reaction is allowed to proceed for about 24 hours. The solvent is then removed in vacuo and the resulting reaction product purified by chromatography on silica gel. The purified 5'-O-trityl-3'-O-palmityl-2,2'-anhydro-ara-cytidine (XVIII) hydrochloride is dissolved in glacial acetic acid, and water is added with stirring to incipient turbidity. The clear solution is then warmed to about 40°C. for 16 hours in order to remove the 5'-O-trityl substituent. The resulting reaction mixture is concentrated in vacuo, and the resulting residue extracted with ether to remove any unreacted palmitoyl chloride and triphenylmethyl carbinol. The resulting product is then macerated thoroughly with 2 percent sodium bicarbonate solution to completely hydrolyze to anhydro ring and neutralize the hydrochloride. The resulting crude 3'-O-palmityl-aracytidine (III) is dried in vacuo. It can be further purified by recrystallization from methanol or by preliminary purification by chromatography on silica gel followed by recrystallization from methanol, to yield purified 3'-O-palmityl-ara-cytidine (III).

EXAMPLE 9

2',3'-Di-O-palmityl-ara-cytidine (V) by Process A.

N$^4$-trichloroethoxycarbonyl-5'-O-trityl-ara-cytidine (VII) (19.8 g., 30 millimoles) is dissolved in 150 ml. of anhydrous pyridine. Palmitic anhydride (16.4 g., 33 millimoles) is added. The resulting suspension is stirred overnight and a clear solution results as the solid palmitic anhydride reacts. The reaction mixture is concentrated in vacuo to a syrup. The syrup is dissolved in ethyl acetate and evaporated in vacuo, and this dissolution and evaporation are repeated twice. The resulting final syrup (about 39 g.) is dissolved in 500 ml. of ether and washed with 300 ml. of freshly prepared 1 percent sodium bicarbonate solution and then with three 70 ml. portions of water. The ether layer is dried over anhydrous sodium sulfate and the solvent removed to yield 34.8 g. of syrupy residue. TLC (silica gel, cyclohexane(ethyl acetate 1:1) show three main components with R$_f$ 0.78 and 0.39, the latter as a double spot.

The syrup is chromatographed on silica gel (2.5 kg.) using ethyl acetate as the eluting solvent. As soon as UV-absorbing material begins to appear in the effluert, 200 ml. fractions are collected. From a total of 32 fractions, fractions 1 to 4 contain about 5.07 g. of purified N$^4$-trichloroethoxycarbonyl-5'-O-trityl-2',3'-di-(O-palmityl)-ara-cytidine (X). Fractions 4 to 32 contain about 16.34 g. of solids, with three distinguishable (TLC) components in most fractions. This material (16.34 g. solids) is rechromatographed on silica gel, using ethyl acetate:cyclohexane 1:1 as eluting solvent. Upon elution (UV) of products, 100 ml. fractions are collected. Fractions 1 to 60 contain about 6.98 g. of X. Fractions 1 to 14 from the first column (above) are combined to yield 12.05 g. of X. This material is dissolved in 200 ml. of 80 percent acetic acid — 20 percent water, and 12 g. of zinc dust is added. The mixture is stirred overnight. Residual zinc is removed by filtration, and the filtrate is heated on a steam bath for 2 hours to complete the removal of the 5'-O-trityl protective group. The solution is then concentrated to dryness in vacuo and the dry residue dissolved in chloroform and washed with two 200 ml. portions of water. The chloroform layer is dried over anhydrous sodium sulfate and then concentrated in vacuo to a solid residue. The residue is twice recrystallized from acetone to yield 3.4 g. of crystalline 2',3'-di-(O-palmityl)-ara-cytidine (V), M.P. 144°–145°.

Calculated for $C_{41}H_{73}O_7N_3$:
                Calculated: C, 68.39; H, 10.22;
                            N, 5.84.
                Found: C, 68.16; H, 10.26;
                       N, 6.07.

UV: 238 m$\mu$ $\epsilon$ = 7,800
    271 m$\mu$ $\epsilon$ = 8,250
TLC: Silica gel plates, solvent system chloroform:methanol 95:5,
     R$_f$ = 0.22.

We claim:
1. A compound of the formula

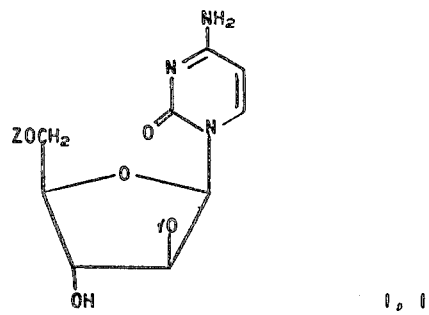

wherein Y is selected from the group consisting of 1.

$$\underset{\text{RC—}}{\overset{\overset{\text{O}}{\|}}{}}$$

wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms, including such radicals substituted by halogen, hydroxyl, carboxyl, nitro, alkoxyl or mercapto groups, and

2.

$$\underset{\text{R'OC—}}{\overset{\overset{\text{O}}{\|}}{}}$$

wherein R' is a radical selected from the group consisting of aliphatic of from 1 to 20 carbon atoms, aromatic of from 6 through 10 carbon atoms, and araliphatic of from 7 through 12 carbon atoms, and Z is selected from thr group consisting of Y and hydrogen; and pharmaceutically acceptable acid additon salts thereof.

2. A compound of claim 1 wherein Z is hydrogen.
3. A compound of claim 1 wherein Y is $$\underset{\text{RC—,}}{\overset{\overset{\text{O}}{\|}}{}}$$

wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms, and monocyclic heterocyclic of from 4 through 10 carbon atoms, including such radicals substituted by halogen, hydroxyl, carboxyl, nitro, alkoxyl or mercapto groups, and Z is hydrogen; and pharmaceutically acceptable acid addition salts thereof.

4. A compound of claim 1 wherein Z is hydrogen and Y is $$\underset{\text{RC—}}{\overset{\overset{\text{O}}{\|}}{}}$$

wherein R is $(CH_2)_{14}CH_3$, namely, 2'-O-palmityl-ara-cytidine.

5. A compound of claim 1 wherein Z is hydrogen and Y is $$\underset{\text{RC—}}{\overset{\overset{\text{O}}{\|}}{}}$$

wherein R is $(CH_2)_{16}CH_3$, namely, 2'-O-stearyl-ara-cytidine.

6. A compound of claim 1 wherein Z is hydrogen and Y is $$\underset{\text{R'OC—}}{\overset{\overset{\text{O}}{\|}}{}}$$

wherein R' is methyl, namely, 2'-O-methoxycarbonyl-ara-cytidine.

7. A compound of claim 1 wherein Y and Z are selected from the group consisting of
1.

$$\underset{\text{RC—}}{\overset{\overset{\text{O}}{\|}}{}}$$

wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms, including such radicals substituted by halogen, hydroxyl, carboxyl, nitro, alkoxyl or mercapto groups, and

2.

$$\underset{\text{R'OC—}}{\overset{\overset{\text{O}}{\|}}{}}$$

wherein R' is a radical selected from the group consisting of aliphatic of from 1 through 20 carbon atoms, aromatic of from 6 through 10 carbon atoms, and aralaphatic of from 7 through 12 carbon atoms;

and pharmaceutically acceptable acid addition salts thereof.

8. A compound of claim 1 wherein Y and Z are $$\underset{\text{RC—,}}{\overset{\overset{\text{O}}{\|}}{}}$$

wherein R is a radical selected from the group conisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms, including such radicals substituted by halogen, hydroxyl, carboxyl, nitro, alkoxyl or mercapto groups; and pharmaceutically acceptable acid addition salts thereof.

9. A compound of claim 1 wherein Z and Y are $$\underset{\text{RC—}}{\overset{\overset{\text{O}}{\|}}{}}$$

wherein R is $(CH_2)_{14}CH_3$, namely, 2',5'-di-O-palmityl-ara-cytidine.

10. A compound of the formula

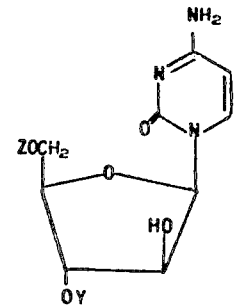

wherein Y is selected from the group consisting of
1.

$$\overset{O}{\underset{\|}{RC-}}$$

wherein R is a radical selected from the group consisting of aliphatic of from 1 to 20 carbon atoms, aromatic of from 6 through 10 carbon atoms, cage-type hydrocarbon of from 7 through 20 carbon atoms, monocyclic aliphatic of from 4 through 10 carbon atoms, aralphatic of from 7 through 12 carbon atoms and monocyclic heterocyclic of from 4 through 10 carbon atoms, including such radicals substituted by halogen, hydroxyl, carboxyl, nitro, alkoxyl or mercapto groups, and

2.

$$\overset{O}{\underset{\|}{R'OC-}}$$

wherein R' is a radical selected from the group consisting of aliphatic of from 1 through 20 carbon atoms, aromatic of from 6 through 10 carbon atoms, and aralphatic of from 7 through 12 carbon atoms, and Z is selected from the group consisting of Y and hydrogen; and pharmaceutically acceptable acid addition salts thereof.

11. A compound of claim 10 wherein Z is hydrogen.

12. A compound of claim 10 wherein Z is hydrogen and Y is $$\overset{O}{\underset{\|}{RC-}},$$

wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, aralphatic of from 7 through 12 carbon atoms and monocyclic heterocyclic of from 4 through 10 carbon atoms, including such radicals substituted by halogen, hydroxyl, carboxyl, nitro, alkoxyl or mercapto groups; and pharmaceutically acceptable acid addition salts thereof.

13. A compound of claim 10 wherein Z is hydrogen and Y is $$\overset{O}{\underset{\|}{R'OC-}}$$

wherein R' is methyl, namely, 3'-O-methoxycarbonyl-ara-cytidine.

14. A compound of claim 10 wherein Z is hydrogen and Y is $$\overset{O}{\underset{\|}{RC-}}$$

wherein R is $(CH_2)_{14}CH_3$, namely, 3'-O-palmityl-ara-cytidine.

15. A compound of claim 10 wherein Z is hydrogen and Y is $$\overset{O}{\underset{\|}{RC-}}$$

wherein R is $(CH_2)_{16}CH_3$, namely, 3'-O-stearyl-ara-cytidine.

16. A compound of claim 10 wherein Z is hydrogen and Y is $$\overset{O}{\underset{\|}{RC-}}$$

wherein R is phenyl, namely, 3'-O-benzoyl-ara-cytidine.

17. A compound of claim 10 wherein Y and Z are $$\overset{O}{\underset{\|}{RC-}},$$

wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, aralphatic of from 7 through 12 carbon atoms and monocyclic heterocyclic of from 4 through 10 carbon atoms, including such radicals substituted by halogen, hydroxyl, carboxyl, nitro, alkoxyl or mercapto groups; and pharmaceutically acceptable acid addition salts thereof.

18. A compound of claim 10 wherein Y and Z are $$\overset{O}{\underset{\|}{RC-}}$$

wherein R is $(CH_2)_{14}CH_3$, namely, 3',5'-di-(O-palmityl)-ara-cytidine.

19. A compound of claim 10 wherein Y and Z are $$\overset{O}{\underset{\|}{RC-}}$$

wherein R is phenyl, namely, 3'5'-di-(O-benzoyl)-ara-cytidine.

20. A compound of the formula

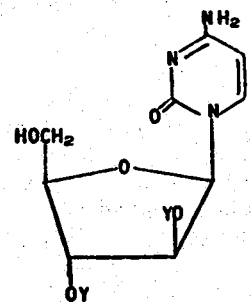

wherein Y is selected from the group consisting of

1.

$$\overset{O}{\underset{\|}{RC-}}$$

wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, aralphatic of from 7 through 12 carbon atoms and monocyclic heterocyclic of from 4 through 10 carbon atoms, including such radicals substituted by halogen, hydroxyl, carboxyl, nitro, alkoxyl or mercapto groups, and

2.

$$\overset{O}{\underset{\|}{R'OC-}}$$

wherein R' is a radical selected from the group consisting of aliphatic of from 1 through 20 carbon atoms, aromatic of from 6 through 10 carbon atoms, and aralphatic of from 7 through 12 carbon atoms, and Z is selected from the group consisting of Y and hydrogen, and pharmaceutically acceptable acid addition salts thereof.

21. A compound of claim 20 wherein Y is $$\overset{O}{\underset{\|}{R'OC-}}$$

wherein R' is methyl, namely, 2',3'-di-(O-methoxycarbonyl)-ara-cytidine.

22. A compound of claim 20 wherein Y is $$\underset{\|}{\overset{O}{RC-}}$$

wherein R is $(CH_2)_{14}CH_3$, namely, 2',3'-di-(O-palmityl)-ara-cytidine.

23. A process for the production of a compound of the respective formulae

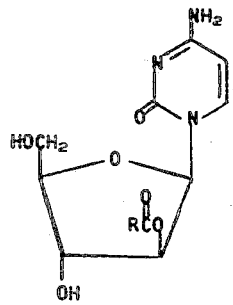

I

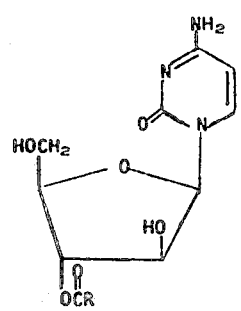

III and

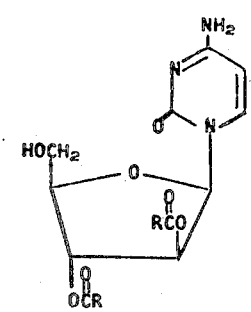

V wherein R of the group $$\underset{\|}{\overset{O}{RC-}}$$

is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, aralphatic of from 7 through 12 carbon atoms and monocyclic heterocyclic of from 4 through 10 carbon atoms, including such radicals substituted by halogen, hydroxyl, carboxyl, nitro, alkoxyl or mercapto groups, comprising 1. mixing a compound of the formula

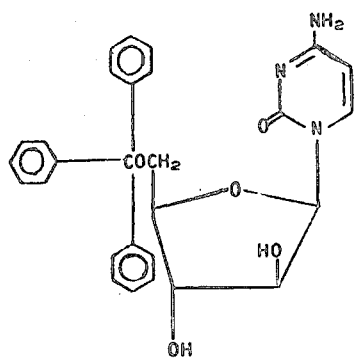

VI with a trihaloethoxycarbonyl halide of the formula $$\underset{\|}{\overset{O}{CX_3CH_2OCX}}$$

wherein X is selected from the group consisting of chlorine and bromine, to yield a corresponding compound of the formula

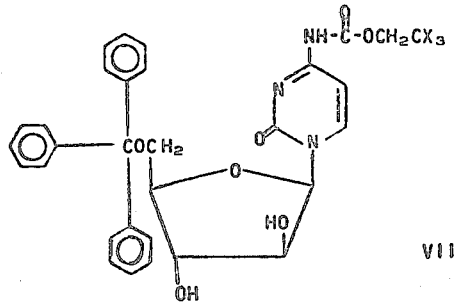

VII wherein X has the same meaning as above;

2. acylating a thus-produced compound to yield a corresponding compound of the respective formulae

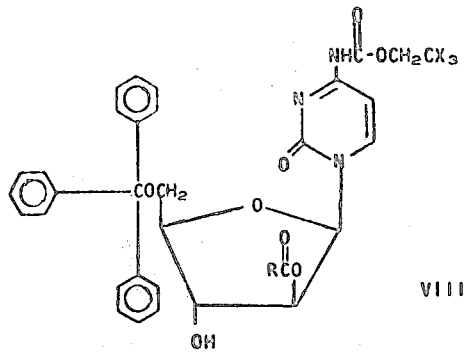

VIII and

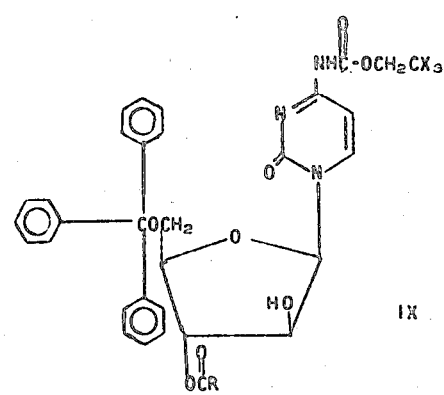

IX

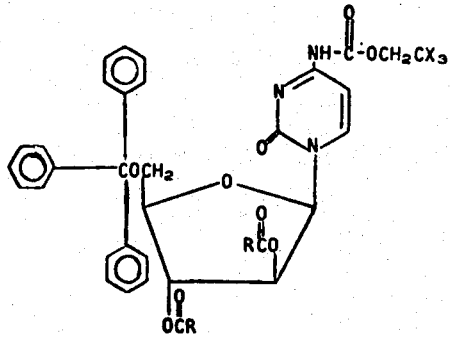

X wherein X and R have the same meaning as above;
3. separating the acylation products from each other; and
4. hydrolyzing at the 5'-O- and $N^4$-positions to yield a corresponding respective compound of Formulae I, III and V, above.

24. A process for the production of a compound of the respective formulae

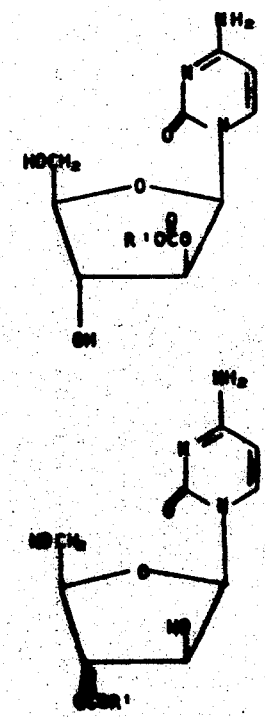

I'

III'

V wherein R of the group $$\overset{O}{\underset{\parallel}{RC-}}$$

is a radical selected from the group consisting of aliphatic of from 1 through 20 carbon atoms, aromatic of from 6 through 10 carbon atoms, cagetype hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms, including such radicals substituted by halogen, hydroxyl, carboxyl, nitro, alkoxyl or mercapto groups, comprising
1. mixing a compound of the formula

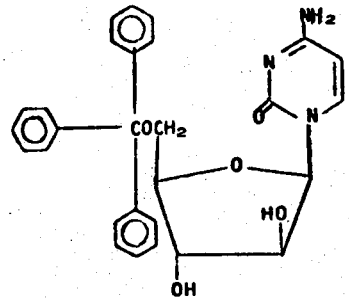

VI with a trihaloethoxycarbonyl halide of the formula $$\overset{O}{\underset{\parallel}{CX_3CH_2OCX}}$$

wherein X is selected from the group consisting of chlorine and bromine, to yield a corresponding compound of the formula

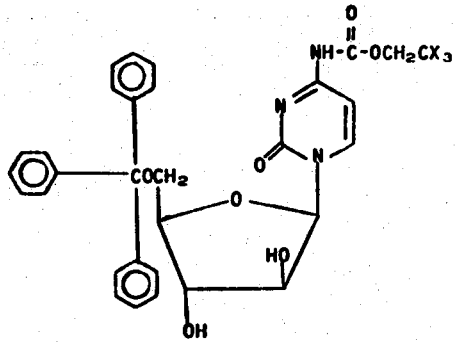

VII wherein X has the same meaning as above;
2. acylating a thus-produced compound to yield a corresponding compound of the respective formulae

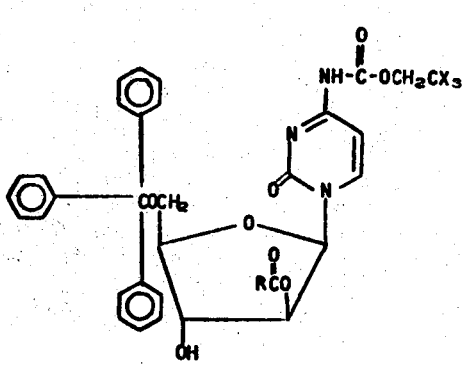

VIII

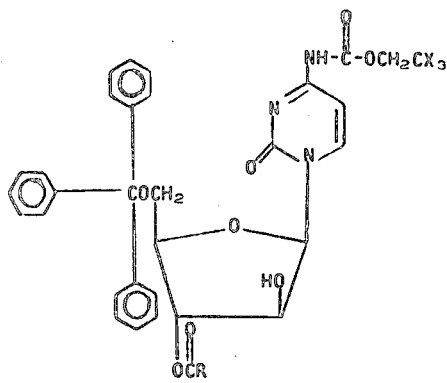

and

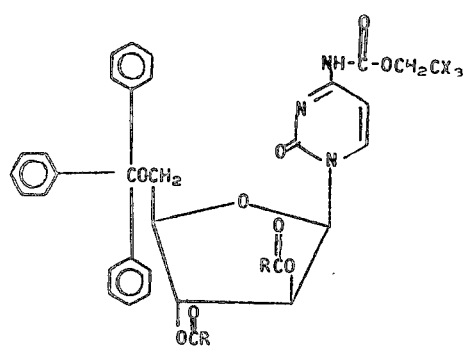

wherein X and R have the same meaning as above;
3. hydrolyzing at the 5'-O- and N⁴-positions to yield corresponding respective compound of Formulae I, III and V, above; and
4. separating the acylation products of Formulae I, III and V from each other.

25. A process according to claim 23 in which the

is palmityl.

26. A process according to claim 23 in which

is stearyl.

27. A process according to claim 23 in which

is benzoyl.

28. A process in accordance with claim 23 wherein the compound of Formula VIII is N⁴-trichloroethoxycarbonyl-5'-O-trityl-ara-cytidine.

29. A process for the production of a compound of the respective formulae

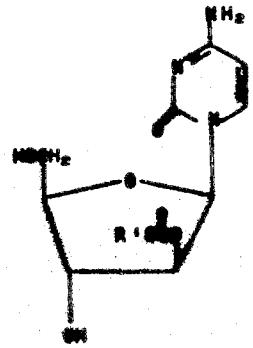

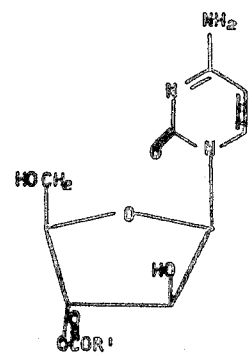 III' and

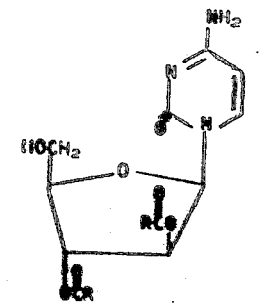 V' wherein R' of the group

is a radical selected from the group consisting of aliphatic of from 1 through 20 carbon atoms, aromatic of from 6 through 10 carbon atoms, and araliphatic of from 7 through 12 carbon atoms, which comprises
1. mixing a compound of the formula

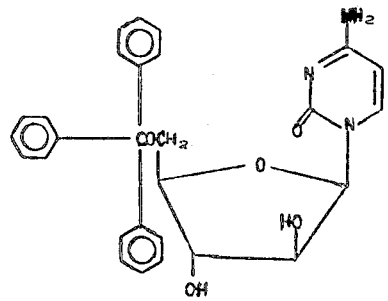 VI with a trihaloethoxycarbonyl halide of the formula

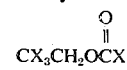

wherein X is selected from the group consisting of chlorine and bromine, to yield a corresponding compound of the formula

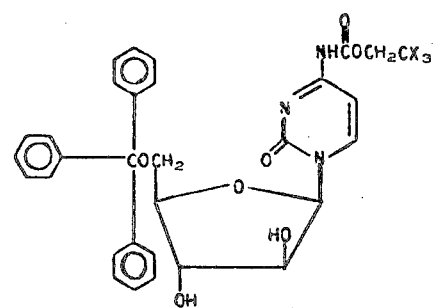 VII wherein X has the same meaning as above;
2. acylating a thus produced compound by mixing it with a compound of the formula $$R'OCCl$$
$$\parallel$$
$$O$$

wherein R' has the same meaning as above, to yield a corresponding compound of the respective formulae

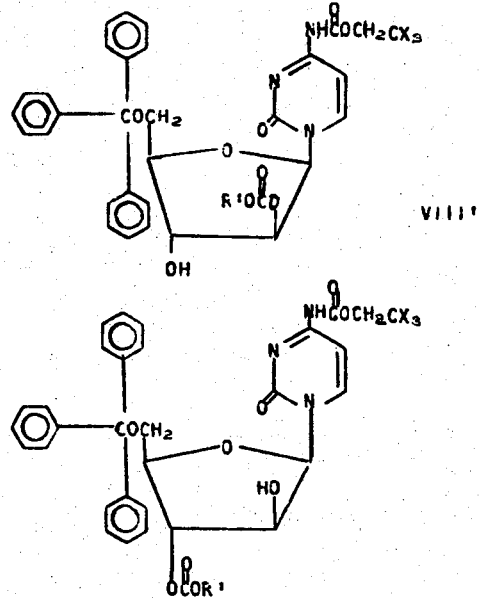

wherein R' and X have the same meaning as above;
3. separating the acylation products from each other, and
4. hydrolyzing at the 5'-O- position and thereby removing the 5'-O-trityl group to yield corresponding compounds of the formulae wherein R' and X have the same meaning as above, and
5. hydrolyzing at the $N^4$-position of the thus produced compounds resulting in the production of a corresponding respective compound of formulae I', III' and V', above.

30. A process for the production of a compound of the respective formulae wherein R' of the group

is a radical selected from the group consisting of aliphatic of from 1 through 20 carbon atoms, aromatic of from 6 through 10 carbon atoms, and aralaphatic of from 7 through 12 carbon atoms, which comprises
1. mixing a compound of the formula

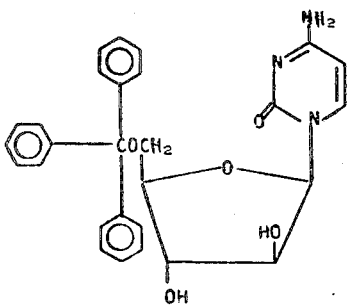

VI with a trihaloethoxycarbonyl halide of the formula

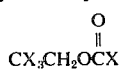

wherein X is selected from the group consisting of chlorine and bromine, to yield a corresponding compound of the formula

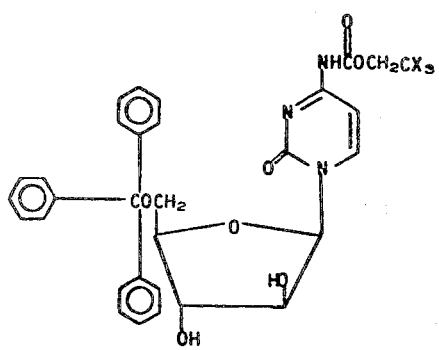

VII wherein X has the same meaning as above;
2. acylating a thus produced compound by mixing it with a compound of the formula

wherein R' has the same meaning as above, to yield a corresponding compound of the respective formula

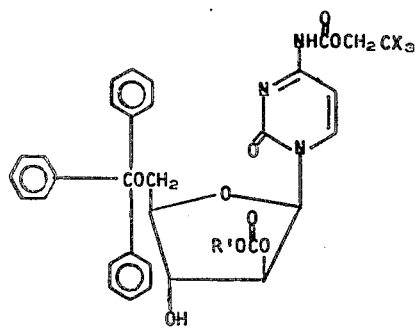

VIII'

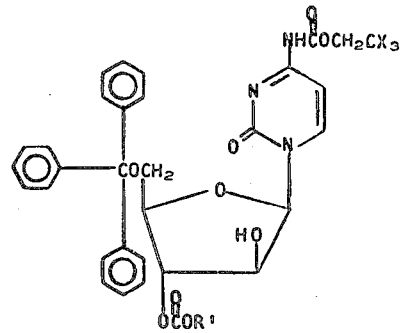

IX'

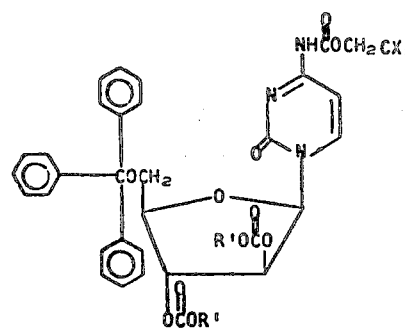

X' wherein R' and X have the same meaning as above;
3. hydrolyzing at the 5'-O-position and thereby removing the 5'-O-trityl group to yield corresponding compounds of the formulae

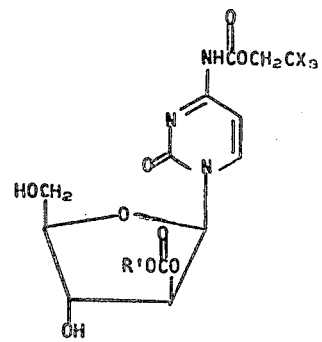

VIII"

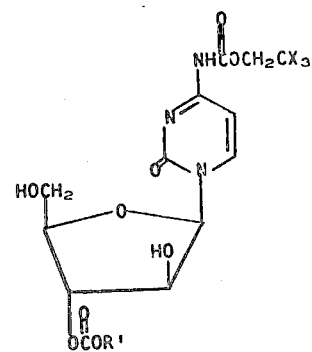

IX"

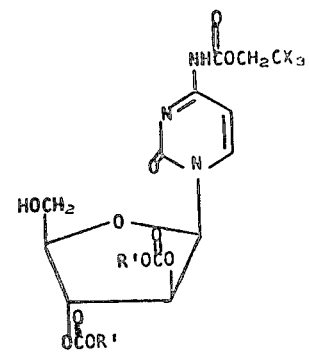

X"

wherein R' and X have the same meaning as above;

4. separating the acylation products from each other, and 5. hydrolyzing at the N⁴-position of the thus produced compounds resulting in the production of a corresponding respective compound of Formulae I', III' and V', above.

31. A process according to claim 29 in which R' is methyl.

32. A process for the production of a compound of the respective formulae

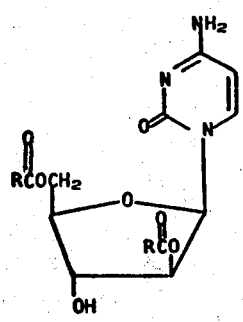

II and

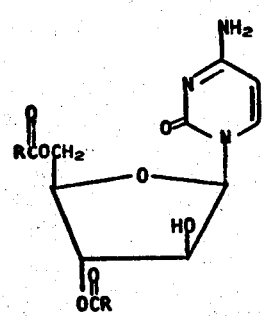

IV wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms, including such radicals substituted by halogen, hydroxyl, carboxyl, nitro, alkoxyl or mercapto groups, which comprises 1. acylating a compound of the formula

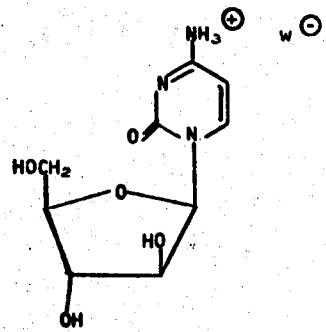

XIa wherein w⁻ is an anion of a strong acid, to yield a corresponding compound of the respective formulae and

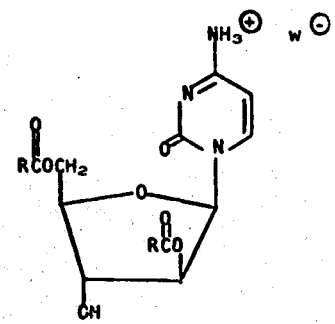

IIa and

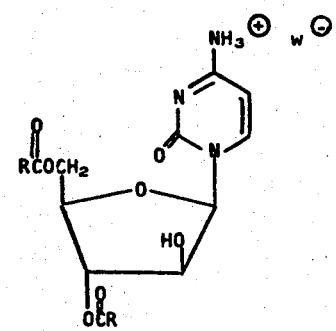

IVa wherein R and w⁻ have the same meaning as above;

2. neutralizing to remove the proton at the N⁴-position of a thus produced corresponding respective compound of Formulae II, IV, and V, above, and 3. separating the acylation products.

33. A process according to claim 31 in which

RC— is palmityl.

34. A process for the production of a compound of the formula

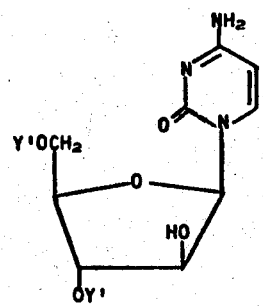

IV' wherein Y' is an aromatic acyl group of 6 through 12 carbon atoms, comprising 1. acylating a compound of the formula

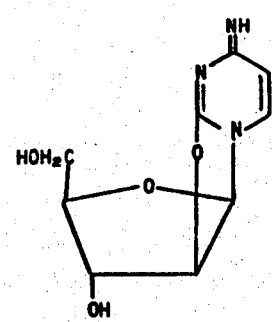

XIIa with an acylating agent

Y'OY' or Y'X₁ wherein Y' has the same meaning as above and X₁ is selected from the group consisting of chloro, bromo and iodo, to give a corresponding compound of the formula

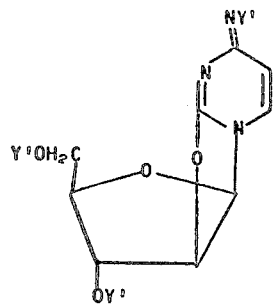

XIII 2. selectively removing the N⁴-acyl group to give a corresponding compound of the formula

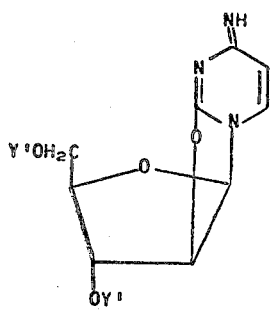

XIV wherein Y' has the same meaning as given above, and 3. hydrolyzing the 2,2'-anhydro linkage to yield the compound of Formula IV', above.

35. A process according to claim 33 wherein $$\overset{O}{\underset{\|}{RC-}}$$

is benzoyl.

36. A process for the production of a compound of the formula

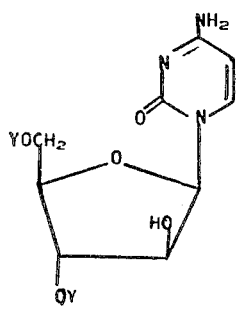

IV wherein Y is selected from the group consisting of $$\overset{O}{\underset{\|}{RC-}}$$

wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms, comprising the steps of 1. acylating a compound of the formula

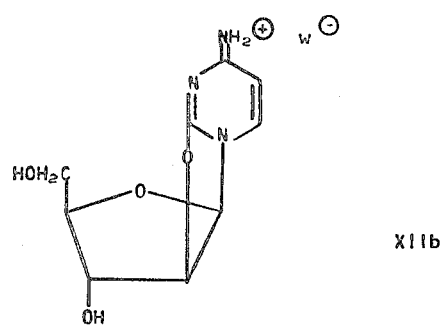

XIIb wherein w⁻ is the anion of a strong acid, with an acylating agent selected from the group consisting of those having the formulae YOY and YX₁ wherein Y has the same meaning as above and X₁ is selected from the group consisting of chlorine, bromine and iodine, to give a corresponding compound of the formula

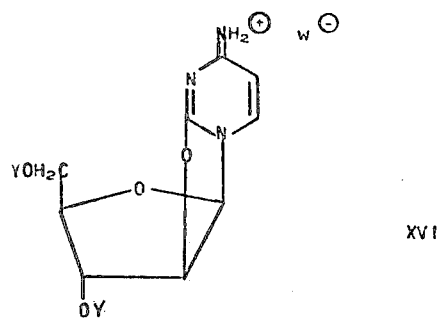

XVI wherein Y and w⁻ are as given above, and 2. hydrolyzing the 2,2'-anhydro linkage to yield a corresponding compound selected from the group consisting of those of Formula IV, above, and an acid addition salt thereof.

37. A process according to claim 36 wherein Y is

1. $$\overset{O}{\underset{\|}{RC-}},$$

wherein R is selected from the group consisting of aliphatic of from 1 through 20 carbon atoms, aromatic of from 6 through 10 carbon atoms, cage-type hydrocarbon of from 7 through 20 carbon atoms, monocyclic aliphatic of 4 through 10 carbon atoms, araliphatic of from 7 through 12 carbon atoms, and monocyclic heterocyclic of from 4 through 10 carbon atoms, including such radicals substituted by halogen, hydroxyl, carboxyl, nitro, alkoxyl and mercapto groups; and 2. $$\overset{O}{\underset{\|}{R'OC-}}$$

wherein R' is a radical selected from the group consisting of aliphatic of from 1 through 20 carbon atoms, aromatic of from 6 through 10 carbon atoms, and araliphatic of from 7 through 12 carbon atoms comprising acylating a compound of the formula

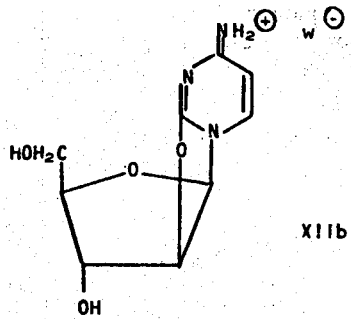

XIIb wherein w⁻ is the anion of a strong acid.

38. A process according to claim 36 wherein $$\overset{O}{\underset{\|}{RC-}}$$

is palmityl.

39. A process for the production of a compound of the formula

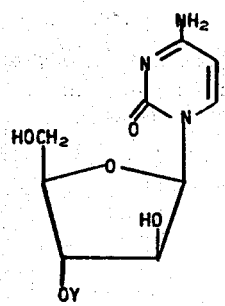

III wherein Y is selected from the group consisting of

1.
$$\overset{O}{\underset{\|}{RC-}},$$

wherein R is selected from the group consisting of aliphatic of from 1 through 20 carbon atoms, aromatic of from 6 through 10 carbon atoms, cage-type hydrocarbon of from 7 through 20 carbon atoms, monocyclic aliphatic of 4 through 10 carbon atoms, araliphatic of from 7 through 12 carbon atoms, and monocyclic heterocyclic of from 4 through 10 carbon atoms, including such radicals substituted by halogen, hydroxyl, carboxyl, nitro, alkoxyl and mercapto groups; and

2.

$$\overset{O}{\underset{\|}{R'OC-}}$$

wherein R' is a radical selected from the group consisting of aliphatic of from 1 through 20 carbon atoms, aromatic of from 6 through 10 carbon atoms, and araliphatic of from 7 through 12 carbon atoms, comprising 1. mixing a compound of the formula

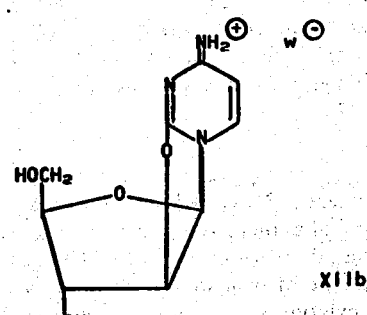

XIIb wherein w⁻ is an anion of a strong acid, with a triphenylmethyl halide to yield a corresponding compound of the formula

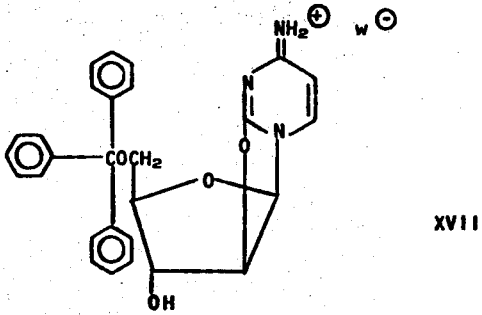

XVII wherein w⁻ has the same meaning as above;

2. mixing a thus produced corresponding compound resulting from step (1) with a corresponding compound selected from the group consisting of YX₁ or YOY wherein Y has the same meaning as above and X₁ is selected from the group consisting of chlorine, bromine and iodine, to yield a corresponding compound of the formula

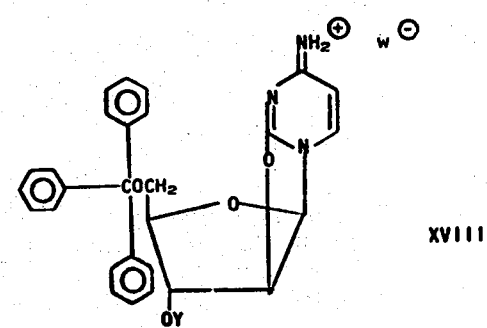

XVIII wherein Y and w⁻ have the same meaning as above;

3. hydrolyzing at the 5'-O-position of a thus produced corresponding compound resulting from step (2) to yield a corresponding compound of the formula

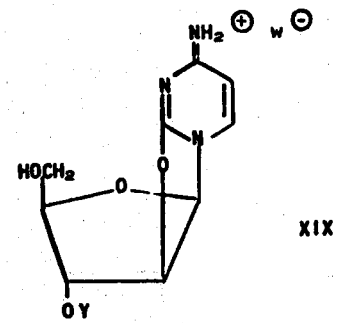

XIX wherein Y and w⁻ have the same meaning as above, and 4. hydrolyzing a thus produced corresponding compound resulting from step (3) to yield a corresponding compound of Formula III, above.

40. A process according to claim 39 wherein Y is $$\overset{O}{\underset{\|}{RC-}},$$

wherein R is a radical selected from the group consisting of aliphatic of from 1 through 20 carbon atoms, aromatic of from 6 through 10 carbon atoms, cage-type hydrocarbon of from 7 through 20 carbon atoms, monocyclic aliphatic of from 4 through 10 carbon atoms, araliphatic of from 7 through 12 carbon atoms and monocyclic heterocyclic of from 4 through 10 carbon atoms.

41. A process according to claim 40 wherein

is palmityl.

42. A compound of the formula

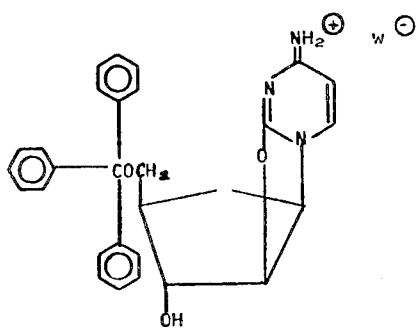

wherein w⁻ is the anion of a strong acid.

43. A compound of the formula

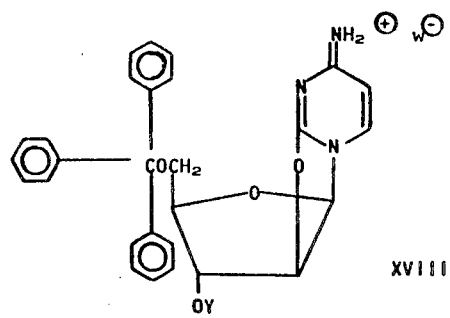

wherein Y is

1. 

wherein R is selected from the group consisting of aliphatic of from 1 through 20 carbon atoms, aromatic of from 6 through 10 carbon atoms, cage-type hydrocarbon of from 7 through 20 carbon atoms, monocyclic aliphatic of 4 through 10 carbon atoms, araliphatic of from 4 through 12 carbon atoms, including such radicals substiituted by halogen, hydroxyl, carboxyl, nitro, alkoxyl and mercapto groups; and 2. 

wherein R' is a radical selected from the group consisting of aliphatic of from 1 through 20 carbon atoms, aromatic of from 6 through 10 carbon atoms, and araliphatic of from 7 through 12 carbon atoms, and w⁻ is the anion of a strong acid.

44. A compound of claim 43 where Y is

wherein R is selected from the group consisting of aliphatic of from 1 through 20 carbon atoms, aromatic of from 6 through 10 carbon atoms, cage-type hydrocarbon of from 7 through 20 carbon atoms, monocyclic aliphatic of 4 through 10 carbon atoms, araliphatic of from 4 through 12 carbon atoms, and monocyclic heterocyclic of from 4 through 10 carbon atoms, including such radicals substituted by halogen, hydroxyl, carboxyl, nitro, alkoxyl and mercapto groups.

45. A compound of claim 43 where

is palmityl.

* * * * *

UNITED STATES PATENT AND TRADEMARK OFFICE
CERTIFICATE OF CORRECTION

PATENT NO. : 3,894,000

DATED : July 8, 1975

INVENTOR(S) : William J. Wechter and Donald T. Warner

It is certified that error appears in the above—identified patent and that said Letters Patent is hereby corrected as shown below:

Column 14, line 41, "$X_2$" should read -- $X_1$ --;

Column 20, line 44, "isotoric" should read -- isotonic --; line 67, "of" should read -- or --;

Column 25, line 52, "methylene" should read -- methanol --;

Column 28, line 2, "$O_3$" should read -- $O_6$ --;

Column 39, line 23, the formula should read as follows instead of as appears in the issued patent:

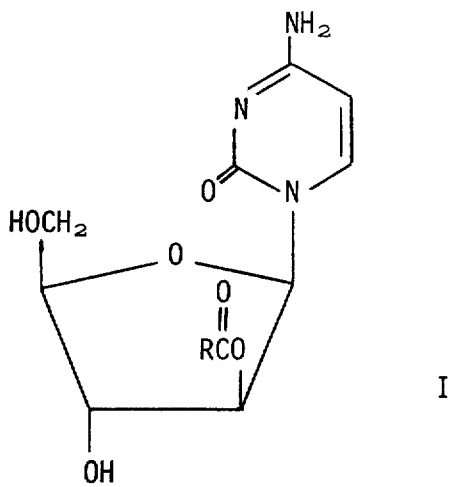

UNITED STATES PATENT AND TRADEMARK OFFICE
CERTIFICATE OF CORRECTION

PATENT NO. : 3,894,000

DATED : July 8, 1975

INVENTOR(S) : William J. Wechter and Donald T. Warner

It is certified that error appears in the above—identified patent and that said Letters Patent is hereby corrected as shown below:

Column 39, line 37, the formula should read as follows instead of as appears in the issued patent:

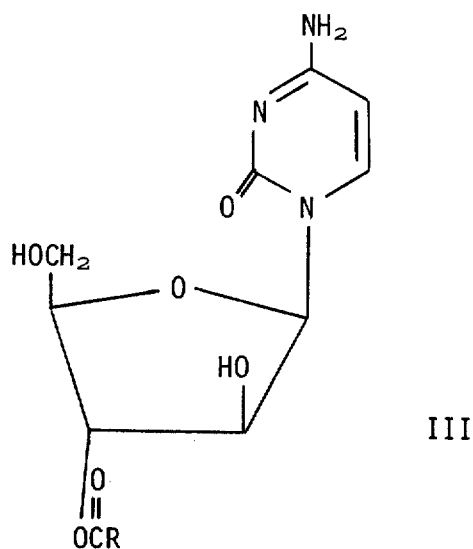

UNITED STATES PATENT AND TRADEMARK OFFICE
CERTIFICATE OF CORRECTION

PATENT NO. : 3,894,000

DATED : July 8, 1975

INVENTOR(S) : William J. Wechter and Donald T. Warner

It is certified that error appears in the above—identified patent and that said Letters Patent is hereby corrected as shown below:

Column 42, line 16, the formula should read as follows instead of as appears in the issued patent:

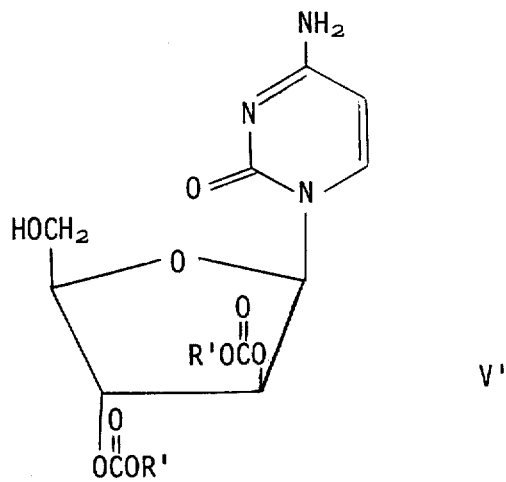

UNITED STATES PATENT AND TRADEMARK OFFICE
CERTIFICATE OF CORRECTION

PATENT NO. : 3,894,000

DATED : July 8, 1975

INVENTOR(S) : William J. Wechter and Donald T. Warner

It is certified that error appears in the above—identified patent and that said Letters Patent is hereby corrected as shown below:

Column 54, line 10, "from 4 through 12 carbon atoms, including such" should read -- from 4 through 12 carbon atoms, and monocyclic heterocyclic of from 4 through 10 carbon atoms, including such --.

Signed and Sealed this

Fifth Day of January 1982

[SEAL]

Attest:

GERALD J. MOSSINGHOFF

Attesting Officer

Commissioner of Patents and Trademarks